(12) United States Patent
Dunger et al.

(10) Patent No.: US 10,052,962 B2
(45) Date of Patent: Aug. 21, 2018

(54) COUPLING ASSEMBLY FOR TRANSFERRING ELECTRICAL ENERGY

(71) Applicants: Mark S. Dunger, St. Louis, MO (US); James F. Dunger, St. Louis, MO (US)

(72) Inventors: Mark S. Dunger, St. Louis, MO (US); James F. Dunger, St. Louis, MO (US)

(*) Notice: Subject to any disclaimer, the term of this patent is extended or adjusted under 35 U.S.C. 154(b) by 74 days.

(21) Appl. No.: 15/193,011

(22) Filed: Jun. 25, 2016

(65) Prior Publication Data
US 2017/0166070 A1    Jun. 15, 2017

Related U.S. Application Data

(63) Continuation of application No. PCT/US2015/010961, filed on Jan. 12, 2015.

(60) Provisional application No. 61/931,535, filed on Jan. 24, 2014.

(51) Int. Cl.
| | |
|---|---|
| *H02J 7/00* | (2006.01) |
| *B60L 11/18* | (2006.01) |
| *H01R 13/631* | (2006.01) |

(52) U.S. Cl.
CPC ....... *B60L 11/1818* (2013.01); *B60L 11/1827* (2013.01); *H01R 13/631* (2013.01); *H02J 7/0027* (2013.01); *H01R 2201/26* (2013.01)

(58) Field of Classification Search
CPC ..... Y02T 90/14; Y02T 10/7005; Y02E 60/12; H02J 7/0042; H01R 24/58; H01R 2103/00
USPC .......................... 320/107, 109; 439/304, 668
See application file for complete search history.

(56) References Cited

U.S. PATENT DOCUMENTS

| | | | | | |
|---|---|---|---|---|---|
| 2,892,990 | A | * | 6/1959 | Werndl | H01R 13/193 200/19.06 |
| 3,665,509 | A | * | 5/1972 | Elkins | H01R 13/523 439/271 |
| 5,409,403 | A | * | 4/1995 | Falossi | H01R 24/38 439/21 |
| 9,203,184 | B1 | * | 12/2015 | Hui | H01R 13/629 |
| 9,761,976 | B2 | * | 9/2017 | Mark | H01R 13/005 |

FOREIGN PATENT DOCUMENTS

| | | |
|---|---|---|
| DE | 102011082092 A1 | 3/2013 |
| JP | 2010103003 A | 5/2010 |
| WO | 2004097995 A1 | 11/2004 |

OTHER PUBLICATIONS

International Search Report in co-pending Internatinoal Application No. PCT/US2015/010961.
Written Opinion of the International Searching Authority in co-pending International Application No. PCT/US2015/010961.

* cited by examiner

*Primary Examiner* — Hien Vu

(57) ABSTRACT

A self-aligning motor assisted electrical Connector with exterior shape of a solid geometric form and accompanying complementary Receptacle (which when placed together form a Unit) that reduces the conventionally necessary exertion of force and dexterity requirements placed upon individuals and automated equipment, for use in transferring energy between a primary charging source and an electric vehicle or an energy storage device, such as a battery or battery bank; provided, however, that a transfer of energy may also occur by engaging such Unit so that the electric vehicle, battery or battery bank becomes the primary source of energy which transfers electric power through the Unit to an ultimate load.

14 Claims, 18 Drawing Sheets

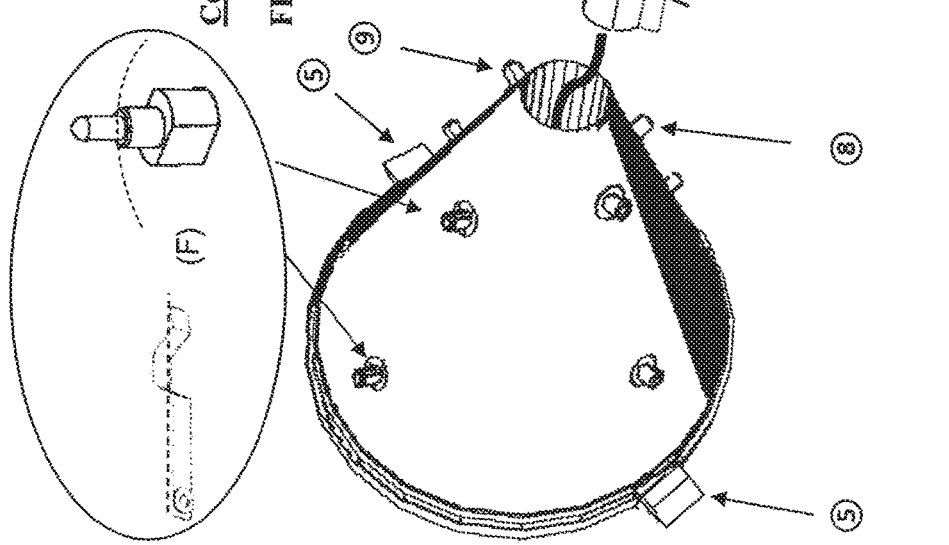
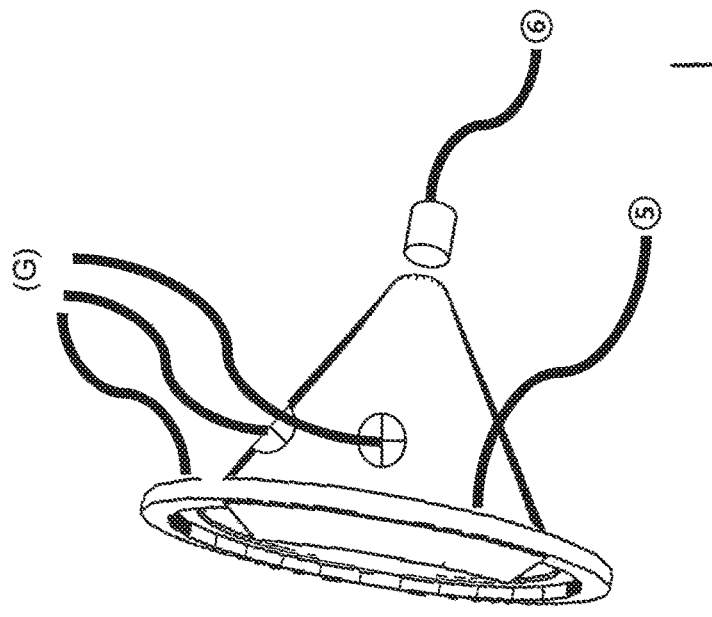
Connector Side
FIG. 3A
Receptacle Side
FIG. 3B
FIG. 3-1

FIG. 3-II

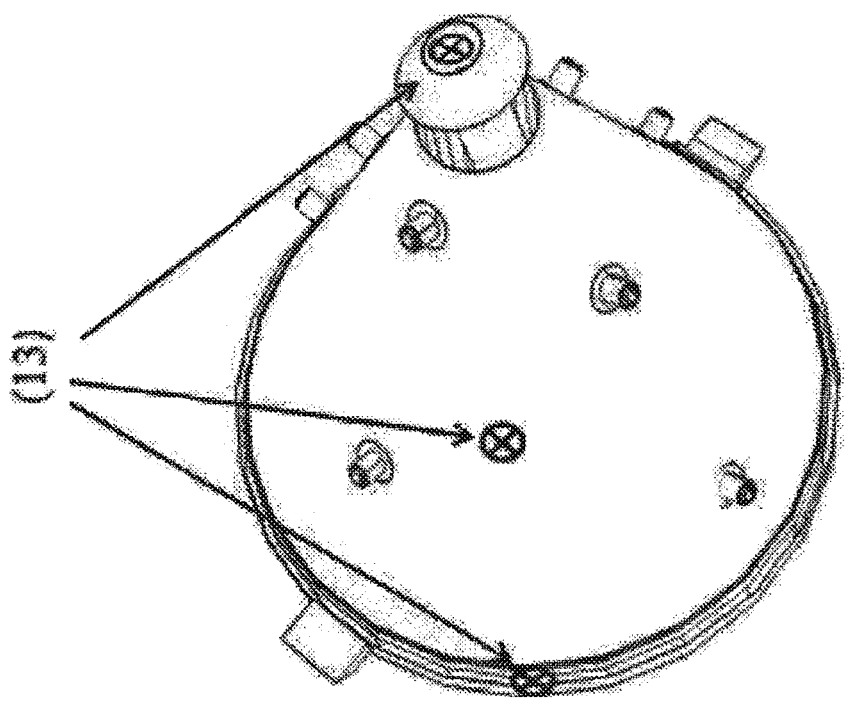
FIG 3-III

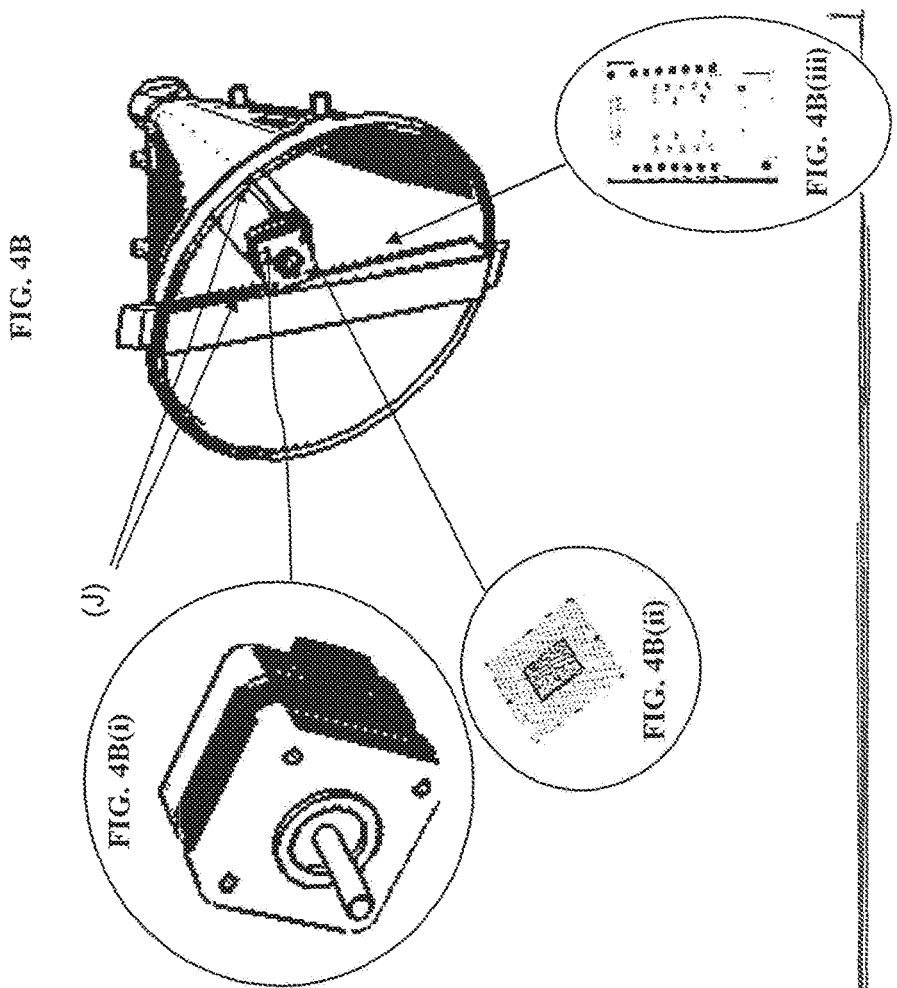
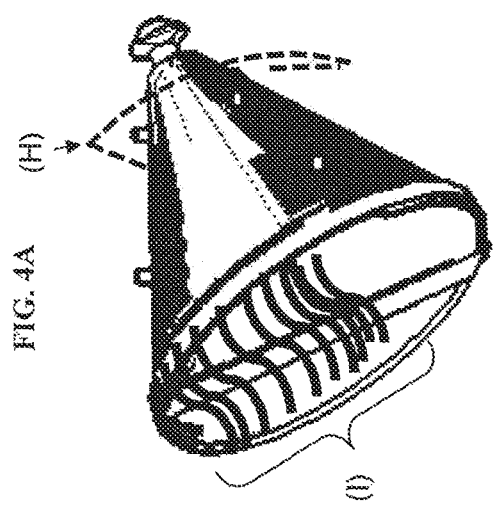

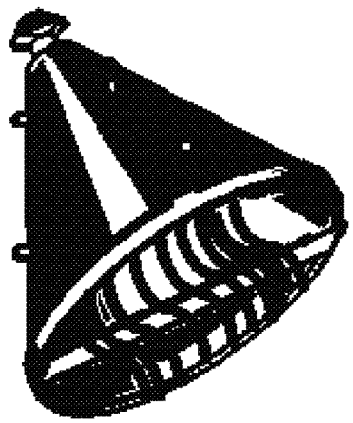
FIG. 5C
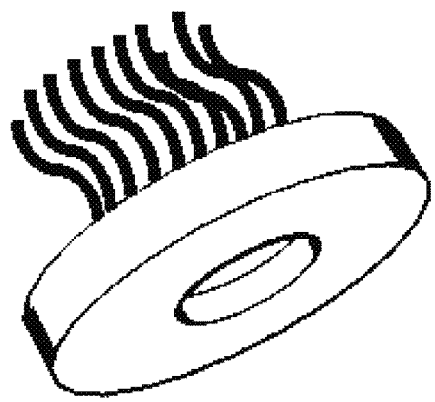
FIG. 5B
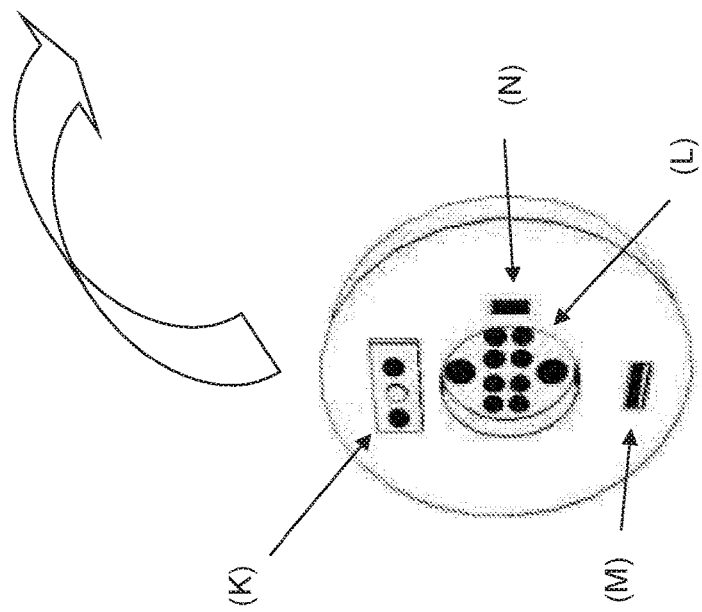
FIG. 5A
FIG. 5

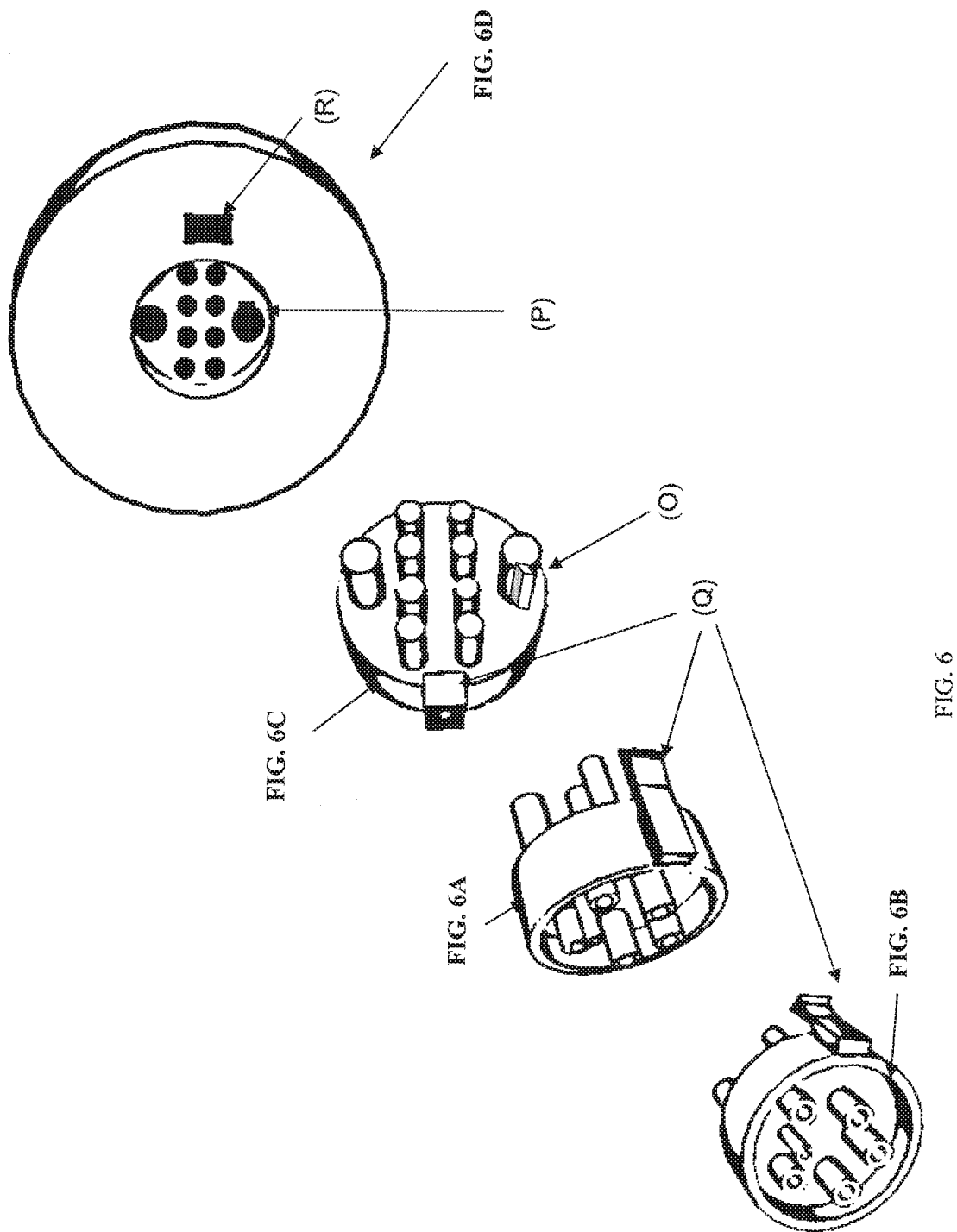

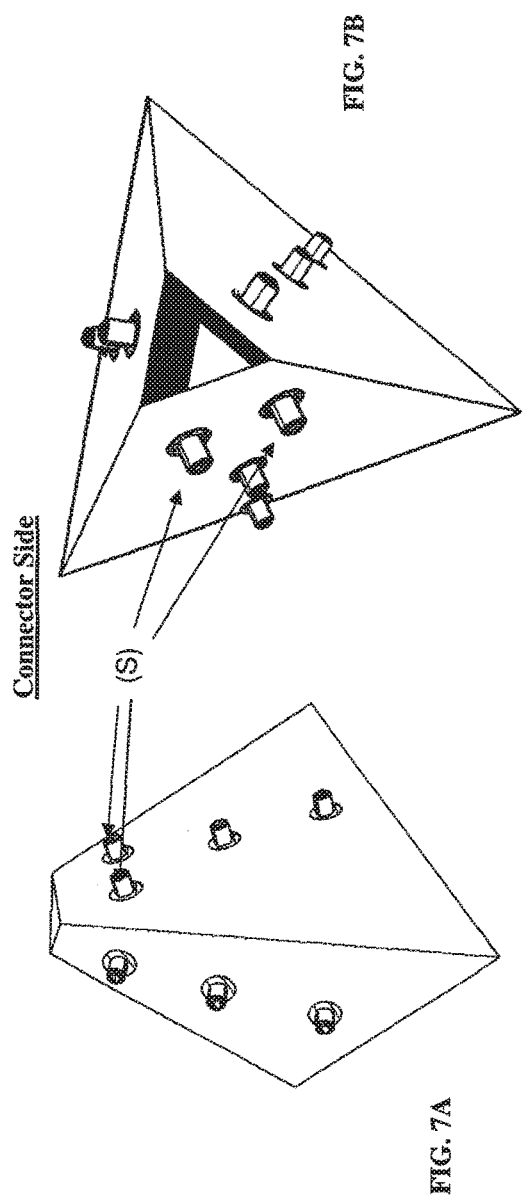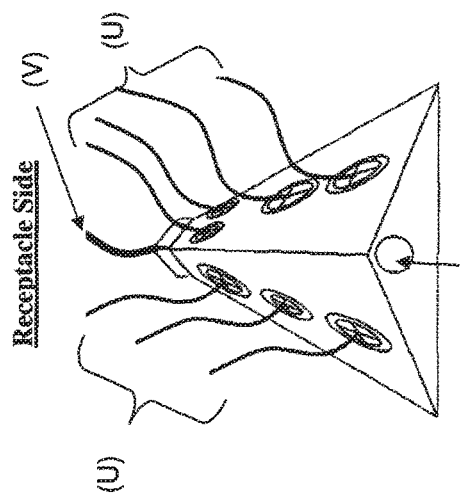
FIG. 7A
FIG. 7B
FIG. 7C
FIG. 7
Connector Side
Receptacle Side
(S)
(T)
(U)
(V)

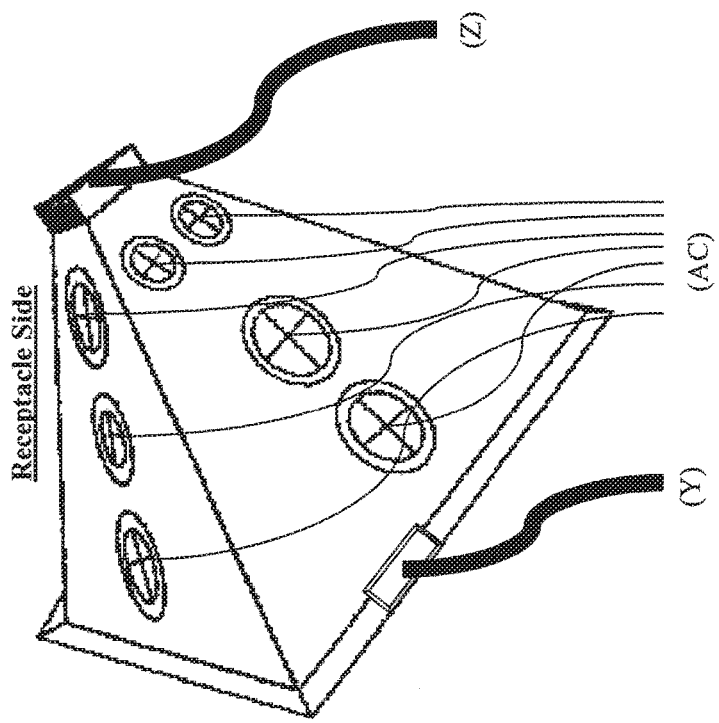
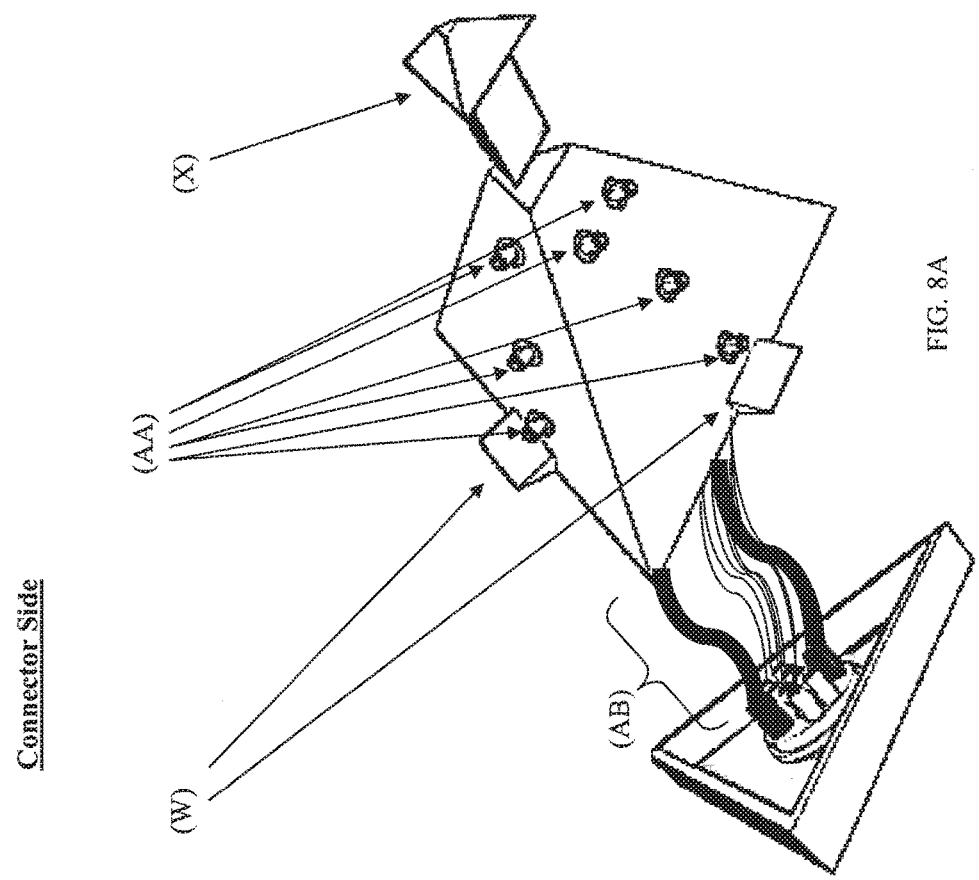
FIG. 8B
FIG. 8A
FIG. 8

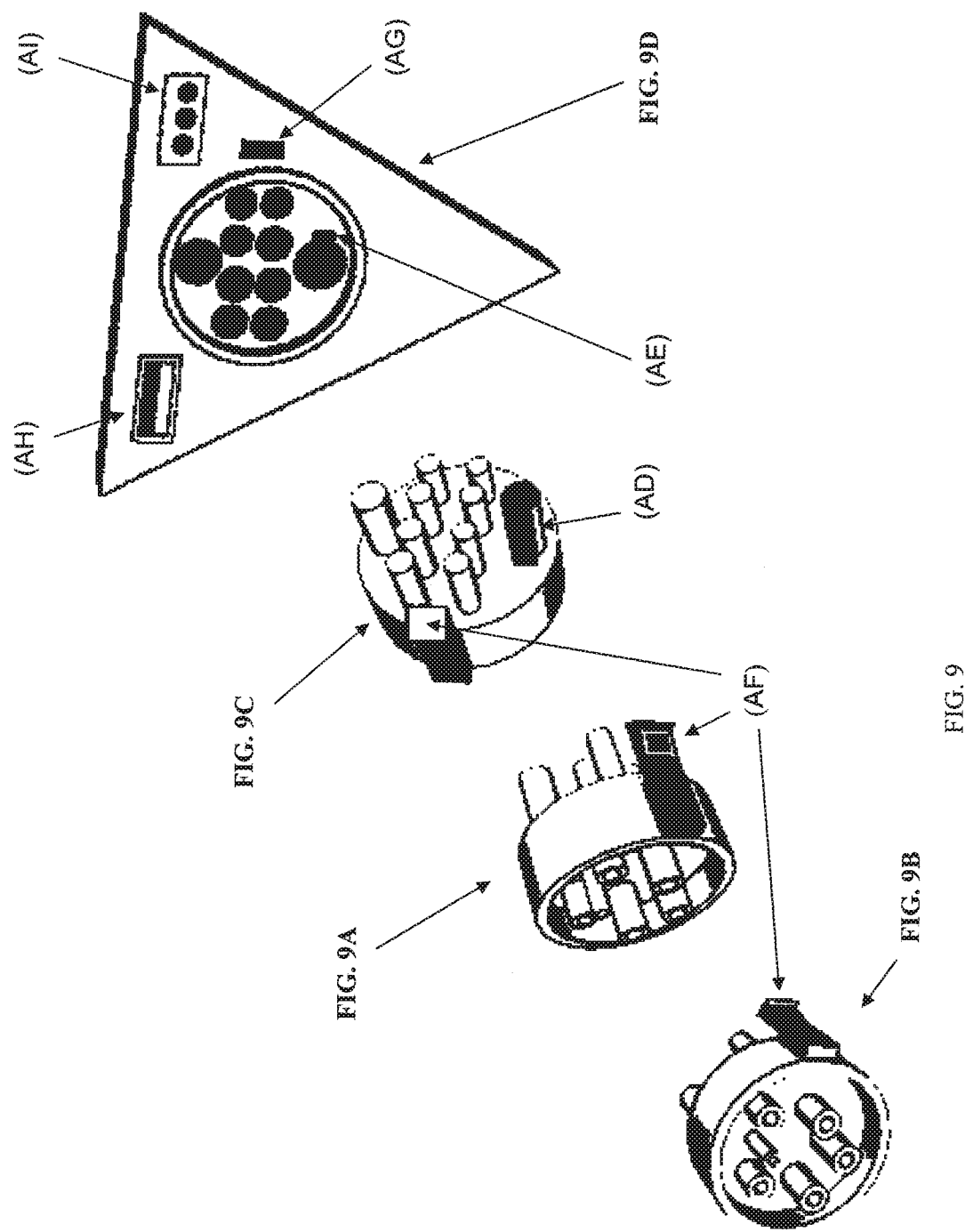

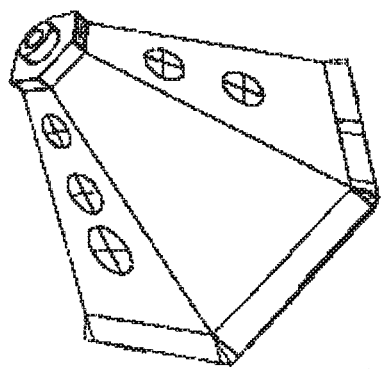
FIG. 10A
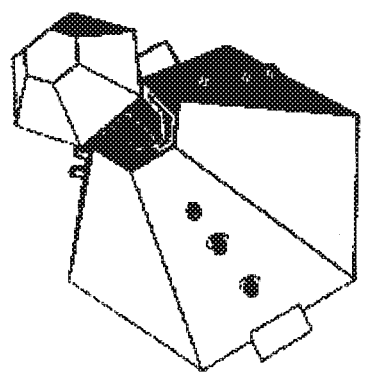
FIG. 10B
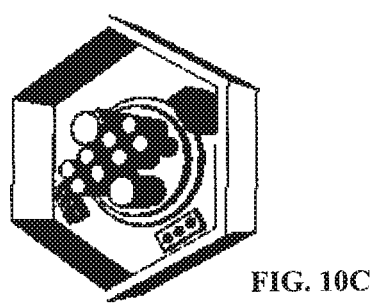
FIG. 10C
FIG. 10

Fig. 14A

Initial insertion of the connector into the opening of the receptacle is a pre-requisite, whether accomplished manually or through the use of robotics, so that the contact points of the connector with the receptacle Control Lines and the CAN BUS are accomplished (even though such contact may be minimal), or all connector contact points are depressed

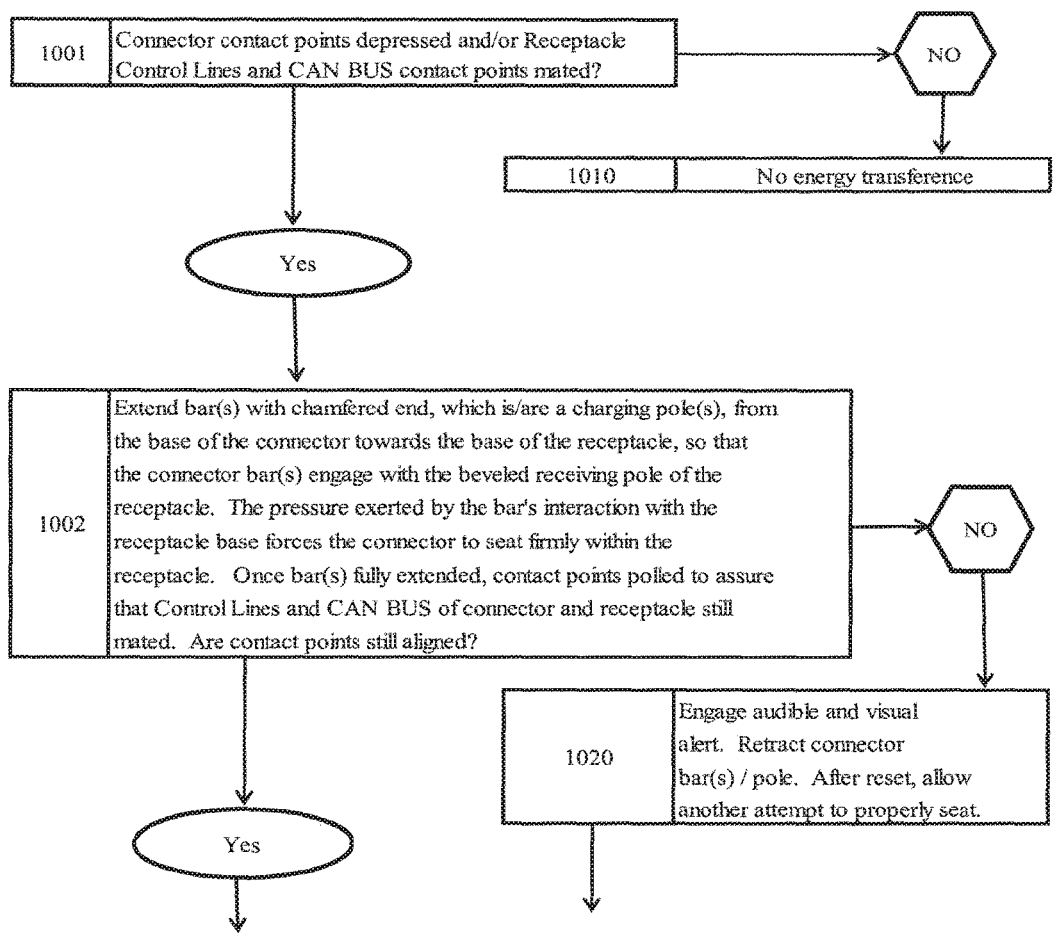

*Continue to Figure 14B*

FIG. 15
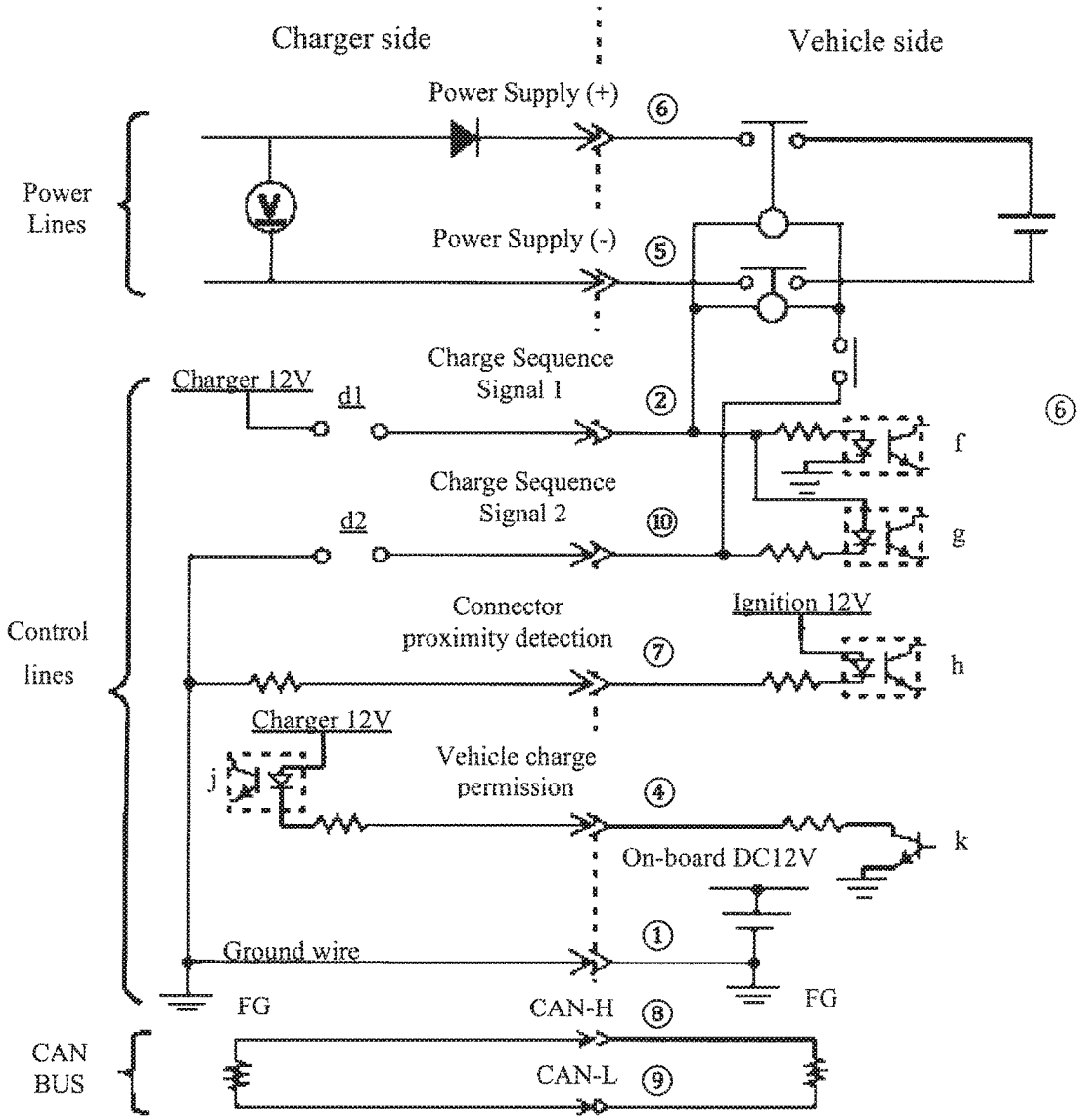
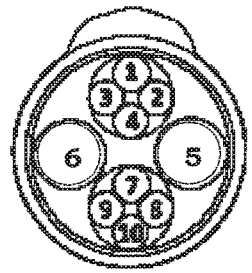
Pin layout

COUPLING ASSEMBLY FOR TRANSFERRING ELECTRICAL ENERGY

FIELD OF THE INVENTION

The concept of this invention is to provide a self-aligning motor assisted electrical Connector with exterior shape of a solid geometric form and accompanying complementary Receptacle (which when placed together form a Unit) that reduces the conventionally necessary exertion of three and dexterity requirements placed upon individuals and automated equipment, for use in transferring energy between a primary charging source and an electric vehicle or an energy storage device, such as a battery or battery bank; provided, however, that a transfer of energy may also occur by engaging such Unit so that the electric vehicle, battery or battery hank becomes the primary source of energy which transfers electric power through the Unit to an ultimate load.

BACKGROUND OF THE INVENTION

Within the past decade there has been an increased awareness of the impact that carbon dioxide and methane emissions have on the earth's environment, and society has responded to the resultant global warming threat by adopting, where possible, clean energy generation practices and policies. In addition to a focus on renewable energy production, we have taken steps to curb excessive use of our fossil fuel energy resources. Consumers have engaged in energy efficiency and demand response programs so as to maximize the resources that are available to us.

Along with the shift in consumer sentiment (concerning the source of and use of electric energy), consumers have come to accept electric vehicles (EVs) as a realistic alternative to vehicles that are propelled by fossil fuels. Electric vehicles can function on the use of renewable energy, and they substantially reduce harmful exhaust pollutants that are emitted into the atmosphere.

One of the more salient concerns of potential EV owners is the phenomena known as "range anxiety". EVs are currently capable of traveling up to 300 miles on a full charge, but the time required to acquire a full recharge is a major concern (which may be several hours), as is the availability of appropriate charging equipment. The "range anxiety" of EV owners may be described as the concern of being stranded—if not indefinitely, then at least for several hours.

Still, for those drivers that tend to travel less than 200 miles on a given day and have a several hour period subsequent to traveling where the EV can be recharged, the EV can be a practical mode of transportation. However, for those instances where the EV owner may need to travel beyond a safe zone, a more wide-spread EV charging network may be necessary for the EV to appeal to the masses.

In addition to the need for a wide-spread charging network, the charging infrastructure equipment itself must be capable of engaging with the subject EV. Presently there are a variety of different charging connectors that are being utilized for a variety of differing EV platforms. The following Table 1 presents a non-exhaustive listing of available charging connectors and the respective applicable standards:

TABLE 1

| Manufacturer | Pin Configuration Standard |
| --- | --- |
| Yazaki | SAE J1772 AC |
| | CHADEMO AC (Japan has unique control signals and overall physical shape) |
| | CHADEMO JEVS G105-1993 (DC) |
| Fujikura | SAE J1772 AC |
| | CHADEMO AC (Japan has unique control signals and overall physical shape) |
| | CHADEMO JEVS G105-1993 (DC) |
| Japan Aviation Electronics Industry | CHADEMO AC (Japan has unique control signals and overall physical shape) |
| | CHADEMO JEVS G105-1993 (DC) |
| Sumitomo Electric Industries | CHADEMO AC (Japan has unique control signals and overall physical shape) |
| DYDEN | CHADEMO JEVS G105-1993 (DC) |
| FURUKAWA ELECTRIC CO., LTD | CHADEMO AC (Japan has unique control signals and overall physical shape) |
| | CHADEMO JEVS G105-1993 (DC) |
| Eaton Corporation | SAE J1772 AC |
| AeroVironment | SAE J1772 AC |
| Fujikura Ltd. | CHADEMO AC (Japan has unique control signals and overall physical shape) |
| | CHADEMO JEVS G105-1993 (DC) |
| Coulomb Technologies | SAE J1772 AC |
| Tesla Motors | Tesla Supercharger proprietary |

The CHAdeMO standard provides the most comprehensive pin configuration and addresses both alternating current (AC) and direct current (DC) charging.

Each of the above identified charging connectors requires not only direct human interaction, but also the exertion of force in order for the connector and the receptacle to correctly couple.

In late 2011, Japan Aviation Electronics Industry, Ltd. (JAEIL) introduced a then new design for a quick vehicle charger touted as "Intuitive with Easy Operability". The product messaging further described as the charger as requiring "No need for complex lever manipulation like the other existing chargers, and achieves one-hand operation. Connection to the EV is made by pushing connector into the EV inlet, and is removed by pushing the release button and then pulling the connector, allowing easy operation just like a normal speed charger".

The new JAEIL charging connector, while attempting to address an ease-of-use issue, continues to require a level of dexterity and strength that may not be available for certain elderly or handicapped persons that are otherwise capable of operating motor vehicles.

The aforementioned charge connectors, all incorporating performance challenges by virtue of the difficulties associated with the exertion required for connector and receptacle mating, have been granted certain intellectual property protections including Nee (U.S. Pat. No. 5,272,431); Hoffman (U.S. Pat. No. 5,344,331); Konda (U.S. Pat. No. 5,593,320); Konda (U.S. Pat. No. 5,807,129 providing a locking device related to the charging connector); Neblett (U.S. Pat. No. 6,371,768) and Yeon (U.S. Pat. No. 8,123,535); as well as pending applications: Williams (Appl # 20020081486); Ohtomo (Appl #20090079389); Fujitake (Appl # 201000228413); Sakurai (Appl # 20100315040); Matsumoto (Appl # 20110034053); Kurumizawa (Appl # 20110201223); Xiaofeng (Appl # 20110260684); Ichikawa (Appl # 20110300753); Ichikawa (Appl # 20120091958); Hani (Appl # 20120091961); Masuda (Appl # 20120098490); Tormey (Appl # 20120135626); Ishida (Appl # 20120186309 providing a locking device related to the charging connector); Osawa (Appl # 20120238131); Osawa (Appl #20120258635); Ichio (Appl # 20120295460); Glick (Appl # 20130017739); Pusch (Appl # 20130049972); Musk (Appl # 20130078839); Hara (Appl # 20130088032); Martin (Appl # 20130089999); Hara (Appl # 20130095678); Umeda (Appl # 20130134937); Kawasaki (Appl # 20130181675); Ishii (Appl # 20130157501); Hara (Appl # 20130196522); Sasaki (Appl # 20130224969) and Ang (Appl # 20130314034).

In addition, attempts have been made to apply robotic technologies to aid in the automation of EV charging, in part offering an added benefit of assisting physically impaired individuals to engage the charging connector with a receptacle. Intellectual property protections have been granted to: Hoffman (U.S. Pat. No. 5,306,999); Lara (U.S. Pat. No. 5,461,298); Wilson (U.S. Pat. No. 5,646,500); Hayashi (U.S. Pat. No. 6,157,162) and Hollar (U.S. Pat. No. 7,999,506), while several additional applicants are pursuing variants of an automated or robotic charging system, including Haddad (Appl # 20110254504); Cornish (Appl # 20120233062); Bonny (Appl # 20120286730); and Gao (Appl # 20130076902). While each of the aforementioned intellectual property and applications involves the application of robotics in some manner, none include an end effector of the type described by this invention that allows those devices to achieve connection without the exertion of significant force and/or without significant end effector manipulation (thus requiring additional functionality of the robotics in terms of robustness and dexterity).

The CHAdeMO standard has been identified as having the most breadth in terms of contact points (including alternating current and direct current energy contacts or poles, control lines and CAN BUS contactors) and, therefore, serves as the standard for the development of this invention. However, the teachings of this invention may accommodate other standards, such as the SAE J1772 configurations, by engaging with fewer contacts on the invention than are available.

The invention disclosed with this application provides a method to align and couple a Connector and a Receptacle which minimizes the necessity for exertion of manual mechanical force (whether by person or by automated equipment). Furthermore, the invention facilitates a truly universal approach to EV charging as the Connector, through myriad available adapters, allows for currently existing charging equipment to become retrofitted and thereby function with the charging Unit that is the subject of this application.

SUMMARY OF THE INVENTION

The typical electric vehicle (EV) charging station requires the EV owner to proactively remove a charging "nozzle", which is tethered by an extension cord, and then connect the device to the EV's built in charging socket or receptacle. The configuration of the connector and the receptacle require an individual to be able to (a) align the components which, even with alignment guides, may be difficult, for handicapped or elderly citizens, and to (b) exert an amount of force to engage the components, which may also be difficult for such individuals.

The present invention addresses the shortcomings of the current art by introducing a charging Unit, consisting of a charging Connector and charging Receptacle, where each constituent component utilizes a like-kind geometric shape, providing a solution that greatly reduces the dexterity and strength requirements associated with engaging such a Connector with the related Receptacle. The present invention is also expected to be utilized to engage in the storage of energy into devices such as a battery or a bank of batteries. The usefulness of this invention is also revealed in its ability to facilitate the transfer of energy from a stored source, be it an EV or a battery, to be utilized to serve an external load (e.g., to operate a refrigerator during a grid power outage).

The Connector and Receptacle components will each include ten points of contact so that the requirements of the CHAdeMO standard are satisfied. A schematic of the standard, identifying the CHAdeMO contacts, is presented at FIG. 15.

The contacts allow for the transference of power as well as communication and control between the source of power, the Unit, and the load being served. In the typical embodiment, the Connector will be located on the energy supply side, whereas the Receptacle be located on the energy storage device side.

In the typical embodiment, the Connector would be predisposed to energize the positive pole (in the case of DC energy transference) first, as most vehicles are manufactured to be negatively grounded.

In an advanced embodiment of the invention, independent intelligence is incorporated into the Connector in the form of a microprocessor and microcontroller/switchgear, so that the Connector is capable of detecting whether the load side of the Unit is grounded negatively or positively. Such detection allows the Connector to engage the load with a DC charge utilizing first the pole with the correct polarity and then second the pole with the opposite polarity. For example, in an EV that is grounded with the negative terminal, the Connector would close the positive switch (internal to the Connector) first before closing the negative switch—thus avoiding a potential short circuit.

The charging Connector component of the Unit also has application as an end effector for robotic/articulated arm charging methods. The ease of alignment and reduction in torque required to engage the Unit indicate an approach to effectively allow such automated equipment to work efficiently and to theoretically cost reduce such robotic systems, as a less robust arm or manipulator will be possible.

These and other objects may become more apparent to those skilled in the art upon review of the summary of the invention as provided herein, and upon undertaking a study of the description of its preferred embodiments, in view of the drawings.

DESCRIPTION OF THE DRAWINGS

In referring to the drawings,

FIG. 3-I consisting of FIG. 3A and 3B provides a schematic of the conical configuration of the charger side Connector and the associated energy storage device side Receptacle;

FIG. 3A provides a schematic of the conical configuration of the charger side Connector;

FIG. 3B provides a schematic of the energy storage device side Receptacle;

FIG. 3-II consisting of FIG. 3C and FIG. 3D provides a schematic of the base poles of the Connector and the Receptacle, respectively, and the receiving area of the Receptacle;

FIG. 3-III provides a schematic of the Connector including at least one camera;

FIG. 4 consisting of FIG. 4A, FIG. 4B(i), 4B(ii), FIG. 4B and FIG. 4B(iii) shows a schematic of the interior mechanisms of the Connector depicted in FIG. 3A;

FIG. 4A provides a schematic view of the Connector displaying the wiring harness entering the Connector with the external Connector contactors located in a spiral configuration on the exterior of the Connector including the apex pole extending from the Connector exterior;

FIG. 4B provides a schematic view of the interior mechanisms of the Connector depicted in FIG. 4A;

FIG. 4B(i) provides a schematic view of the pole drive motor;

FIG. 4B(ii) provides a schematic view of the microprocessor;

FIG. 4B(iii) provides a schematic view of the terminal bus with relay switches;

FIG. 5 consisting of FIG. 5A, FIG. 5B and FIG. 5C provides a schematic of the end cap to be affixed to the Connector described in FIG. 3A;

FIG. 5A provides a schematic view of the end cap with charging and CAN BUS input openings and a USB port with lighted display;

FIG. 5B provides a schematic view of the end cap depicted in FIG. 5A with the wiring harness extending from the end cap side facing the Connector interior;

FIG. 5C provides a schematic view of the Connector depicted in FIG. 4A with the wiring harness that extends to and adjoins the end cap;

FIG. 6 consisting of FIG. 6A, FIG. 6B, FIG. 6C and FIG. 6D depicts a configuration of an adapter which provides, on one side, a standard interface to the end cap described in FIG. 5, and on the other side, a custom interface to a currently available vehicle charger (of the types identified in Table 1 of the Specification);

FIG. 6A provides a schematic view of the adapter revealing both receiving pins (for a charging device identified in Table 1 of the Specification) and connecting pins for mating with the end cap depicted in FIG. 6D;

FIG. 6B provides a schematic view that depicts the connection configuration of a charging device identified in Table 1 of the Specification;

FIG. 6C provides a schematic view of the adapter pin configuration that will mate with the end cap depicted in FIG. 6D;

FIG. 6D provides a schematic view of an end cap that will mate with an adapter depicted in FIG. 6C and indicates the alignment openings that ensure proper mating of the circuitry;

FIG. 7 consisting of FIG. 7A and FIG. 7B for the Connector side and FIG. 7C for the Receptacle side provides a schematic of the triangular pyramid configuration of the charger side Connector and the associated energy storage device side Receptacle;

FIG. 7A provides a schematic view of the exterior of the Connector excluding the poles that identifies a contactor configuration design for proper alignment of circuitry;

FIG. 7B provides a schematic view of FIG. 7A depicting the contactor positioning from an alternate viewing angle;

FIG. 7C provides a schematic view of the Receptacle including contactor zones with wiring between the Receptacle and the vehicle battery and vehicle electronic control equipment;

FIG. 8 consisting of FIG. 8A and FIG. 8B provides a schematic that identifies the contact areas and wiring associated with the charging Unit depicted in FIG. 7;

FIG. 8A provides a schematic view of the exterior of the Connector depicted in FIG. 7A with base and apex poles extended and wiring between the Connector end cap and the Connector interior;

FIG. 8B provides a schematic view of the Receptacle depicted in FIG. 7B with wiring from the contact zones and the apex and base poles to the vehicle;

FIG. 9 consisting of FIG. 9A, FIG. 9B, FIG. 9C, and FIG. 9D shows a schematic of the end cap and the standard-to-custom adapter for the triangular pyramid Connector configuration described in FIG. 7 and FIG. 8;

FIG. 9A provides a schematic view of the adapter revealing both receiving pins (for a charging device identified in Table 1 of the Specification) and connecting pins for mating with the end cap depicted in FIG. 9D;

FIG. 9B provides a schematic view of the adapter depicted in FIG. 6B;

FIG. 9C provides a schematic view of the adapter pin configuration that will mate with the end cap depicted in FIG. 9D;

FIG. 9D provides a schematic view of an end cap for the Connected depicted in FIG. 8A that will mate with the adapter depicted in FIG. 9C and indicates the alignment openings that ensure proper mating with a lighted display and a USB port;

FIG. 10 consisting of FIG. 10A, FIG. 10B and FIG. 10C depicts a hexagonal based pyramid configuration of the charging Connector and Receptacle Unit;

FIG. 10A provides a schematic view of the Receptacle with a pattern of contact zones;

FIG. 10B provides a schematic view of the Connector with a pattern of contactors and extended apex and base poles;

FIG. 10C provides a schematic view of the end cap to be affixed to the Connector of FIG. 10B including the circuitry pins and the lighted display bus and USB port;

DESCRIPTION OF THE PREFERRED EMBODIMENT

Figure 1:
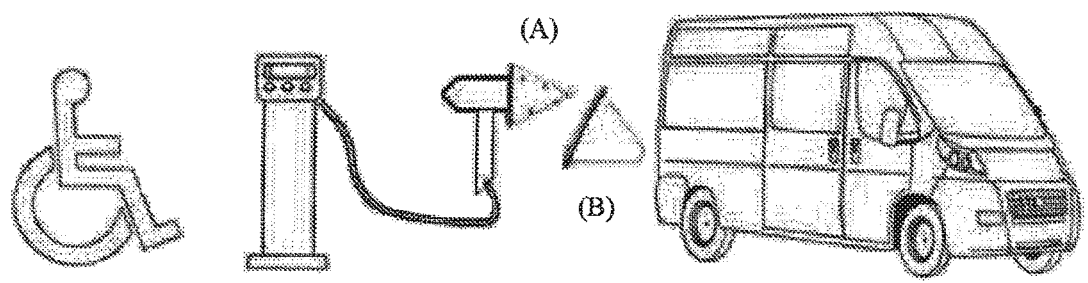
FIG. 1 provides a schematic view of a manual charging system having an alignment and engagement assisted manual electric charging configuration.

The new system of coupling a Connector with its respective Receptacle, by means of utilizing an exterior shape of a solid geometric form to facilitate the alignment of the Unit components, will lessen the degree of physical exertion required to engage in the transfer of energy between a source and a specified load. Through application of the invention, physically challenged individuals or lightweight equipment will be capable of engaging in charging sessions where they would otherwise be taxed or incapable of doing so.

Further, the invention is a capable of deployment on a universal basis and will facilitate the use of currently existing charging infrastructure through the use of "custom-to-standard" adapters.

The invention overcomes the limitations and weaknesses of the current art through the following:

1. The self-aligning Connector and accompanying Receptacle, which together form a Unit, utilize an exterior shape of a solid geometric form which enables the smooth positioning of the components so that the contact points mate. In the preferred embodiment the exterior shape of the solid geometric form of the Connector and the complementary Receptacle is that of a cone (so as to minimize the number of Connector surface planes and, consequently, the number of plane edges that are susceptible to settling and becoming jammed on the planes within the Receptacle). For clarity, the following are attributes of the conical shaped Connector (see item 7 for a fuller description of the Receptacle):
   a. As measured from a perpendicular line forming a right angle beginning at the outer edge of the horizontal line forming the base of the conical frustum and extending upward, the slope of the conical Connector is acute by comparison, or less than 90 degrees; but more than 1 degree when measured as the slope above the horizontal line.
   b. The height of the Connector and the base width will be standardized. Both dimensions will be optimized so as to minimize the cost of constructing the Unit, with additional consideration and emphasis placed on relative weights of the Connector and the Receptacle.
   c. The circumference of the conical shaped Connector and Receptacle, at any given plane horizontal to the symmetrical frustum opening, will be determined in accordance with the dimensions governed by items 1.a and 1.b.
   d. The construction materials of the Unit will include both conductive and non-conductive types.
2. The geometric conical shaped Connector is a frustum such that the apex of the Connector is cut, as if by a plane, so as to form a symmetrical circular opening from which a charging pole or alternating current ("AC") contact protrudes. The base of the Connector also reveals an opening that preferably is a symmetric circle but may he oblong or asymmetric as the Connector may be skewed or oblique in an alternative embodiment.
3. A series of contact mechanisms, such as slot protruding contactors or pogo pin contactors (one for each desired control line or CAN BUS contact point) extend from the outer surface of the conical shaped Connector and are arranged in a spiral pattern emanating from the base of the cone frustum toward the summit. The contactors will be thus positioned so that if equidistant horizontal bands are drawn on the surface (measured from the base of the Connector to the vertex), no two contactors would occupy a same band. At least one camera may be positioned on the surface of the Connector, said camera or cameras to be located so as not to interfere with the functioning of the contactors.
4. Within the interior portion of the conical shaped Connector, the following will be present:
   a. Conductive wiring to service the contactors, the poles or AC contacts, the motor, optional switchgear, optional camera. and the microprocessor and/or microcontroller;
   b. The contactor terminal joints;
   c. One pole that extends vertically from the direction of the center of the base of the frustum through the opening at the apex of the Connector, Which tip surface is contoured to fit firmly against the contact surface located within the apex of the Receptacle; provided, however, that a camera may he positioned on the surface of the pole; provided further, that the pole is spring loaded in the preferred embodiment so as to assist in generating separation of the body of the Connector from the Receptacle during periods where energy is not being transferred; in an alternate embodiment the pole is motorized to create separation;
   d. One or more pole(s) extending outward from the base of the Connector, consisting of at least two tabs (wherein if two tabs, on opposing sides of the base or spaced such that balance of stability in seating the Connector with the Receptacle is achieved and, if more than two tabs, equidistance from each other or in such a pattern as to achieve a like balance of stability); the pole tabs driven by a motor; the pole tabs having a chamfered edge; upon extension of the pole tabs from the base of the Connector, the chamfered edge to exert pressure upon the beveled base ring of the Receptacle such that the Connector is firmly seated within the Receptacle upon full extension of the pole tabs. Firm seating of the Connector with the Receptacle means that (a) each contactor is depressed and in a direct mating position with the appropriate contact area within the Receptacle and (b) the vertical pole, if spring loaded, is also depressed and firmly adjacent to its intended contact area within the Receptacle;
   e. A motor to force extension of the base pole (and potentially the vertical pole);
   f. A microprocessor to analyze:
      i. the type of equipment on the Connector side (the pin configuration and, therefore, the appropriate contactors to engage during an energy transference session);
      ii. the status of the contactors (depressed or not);
      iii, the intended direction of energy flow (so as to determine the grounding of the load);
      iv. determination of the grounding of the load;
      v. timing of energizing the individual poles;
   g. A microcontroller to control:
      i. Engagement of the motor, and thus the extension and retraction of the pole(s)/AC contactors;
         1. In an alternate embodiment, a button may be depressed to engage the motor to either (x) extend or (y) retract, to potentially include a switch for controlling the direction of the motor;
      ii. Alarms;
      iii. Switchgear (if required);
      iv. Energizing of the poles;

h. Switchgear/bus:
  i. To create an exchange for contactors and variations in Connector side equipment pin configurations;
  ii. To serve as a terminal block for the internal wiring;
  iii. To serve as a medium for transferring firmware updates;
  iv. To include at least one relay for control of energizing the pole(s)
  v. To serve as a medium for transferring images from a camera
5. An end-cap for the geometrical conical shaped Connector, which includes:
  a. Wiring from the end-cap to the bus or directly to contactors and poles/the motor;
  b. A standard pin configuration receiving area consisting of a specified number of pin inlets that will satisfy the needs for control lines, CAN BUS lines, camera feeds and energy leads (DC poles or AC contacts);
  c. One of the energy leads will include a key notch so that the pins are appropriately matched with the Connector's wiring;
  d. Visual status lights to indicate the condition of the equipment, to include alarms;
  e. A USB port to support firmware updates for the micro-processor/controller;
  f. An inlet and supporting channel for a retention latch (to be used for interfacing with original equipment or retrofit adapters);
6. Adapters to be provided to enable retrofit use of currently existing charger equipment;
7. The Receptacle, being a like geometrical conical shaped device as compared to the Connector, congruent with the Connector, includes the following attributes:
  a. Contact area horizontal bands, consisting of conductive materials, are evenly spaced within the confined area of the cone. Non-conductive insulating material separates each conductive band from others; such insulating material to include, in the preferred embodiment, LED lights (which may be either single or multi-colored and may display a constant or a sequenced pattern) to assist in locating the Receptacle. There is one conductive band for each contactor which protrudes from the surface of the Connector, and only one Connector contactor will be capable of mating with any single band when the Connector is fully seated with the Receptacle due to the spiral placement of the contactors on the surface of the Connector;
  b. The receiving area of the cone, being free from protrusions, will thus be smooth. In the case of an EV, this will be the contact surface that is visible to the charging attendant. This area can be easily cleaned;
  c. The thickness of the Receptacle body, or wall, will be determined as a function of the required durability of the material of choice and the objective of minimizing weight. The wall thickness will be greater than one micron.
  d. The contact terminals are located on the side of the Receptacle body opposite of the receiving area, and the Receptacle will be connected to the energy storage device's control lines, CAN BUS and energy leads at those locations;
  e. The apex of the Receptacle will include a terminal which surface is congruent, to the surface of the pole of the Connector, essentially in the form of a frustum as a plane dissects the summit to establish a contact bed for the vertical pole of the Connector. In other words, a Receptacle pole contact is located in the apex of the Receptacle, which surface is flat and symmetrical and, in the configuration of a frustum, horizontal to the base of both the Receptacle and the Connector (assuming neither are skewed or oblique);
  f. At the base of the Receptacle, an anchored/larger diameter circular bracket with a beveled interior section serves as the second and possibly third pole(s), and as the source of leverage upon which the Connector's extractable and chamfered base poles or tabs draw upon to seat the Connector with the Receptacle;
  g. A disconnect switch exists on the apex pole (if not already provided on with the energy storage side system), to be opened when the microprocessor is not providing energy engagement instructions (a safety feature to avoid a possible short circuit during cleaning or maintenance of the Receptacle).

With the preferred embodiment, the pole at the summit of the Connector and the corresponding apex of the Receptacle would be the positive pole for DC charging applications. This is due to the fact that most EVs are negatively grounded, and since those poles should be the first to connect, the positive nature of the poles should be employed as a precautionary measure to potentially avoid short circuits. While other precautions are noted that should aid in the avoidance of short circuits, the placement of the positive pole at the summit/apex is the most conservative, generally speaking.

The preferred embodiment described herein offers self-alignment of the Connector and the Receptacle, motor assisted seating of the Unit, easy cleaning of the Receptacle area, and a method for unifying the currently deployed, yet disparate, charging equipment to a common energy transference platform.

In summary, the preferred embodiment associated with this provisional application anticipates that the outer surface of the Connector and the receiving surface of the Receptacle are congruous, so that ubiquitous surface contact between the two would be possible, except for the contacts protruding from the Connector, and that there will he poles (be them direct current positive and negative poles, or alternating current leads) at the apex and at the base of both the Connector and the Receptacle. Alternate configurations of the shape, dimensions, location of contacts, character of the poles, seating mechanism for firmly securing the Unit, pin configurations, etc. may become apparent to those skilled in the art upon review of the summary of the invention as provided herein, and upon undertaking a study of the description of its preferred embodiments, in view of the drawings.

In referring to the drawings, FIG. 1 shows an application of the Connector and Receptacle Unit to a manual electric vehicle charging station, wherein an elderly and/or handicapped individual may employ the Connector (A), which has been affixed to a previously existing charging station through the use of an adapter, to the Receptacle (B) which is integrated into the vehicle's charging system (and is shown outside of the body of the vehicle for illustrative purposes only).

Figure 2:
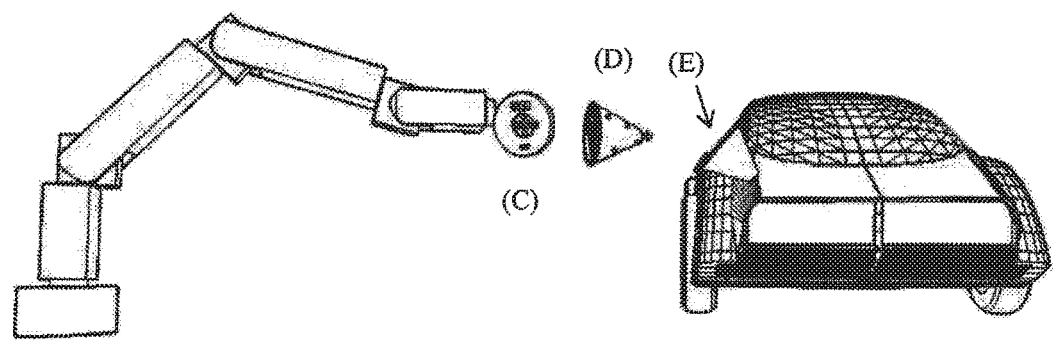
FIG. 2 provides a schematic view of an automated vehicle charging system with an articulated arm application of alignment and engagement.

FIG. 2 shows an application of the Connector and Receptacle Unit to a robotic/articulated arm or automated charging system. The end-cap (C) depicts the pin interface, USB Port and Status Display, while the slight side-view of the Connector (D) reveals the interior base pole and the surface with protruding contactors, both (C) and (D) being depicted as Charge side Connector views, whereas (E) shows the Receptacle that, as in FIG. 1, is integrated into the vehicle's charging system and is shown outside of the body of the vehicle for illustrative purposes only.

Figure 3D:
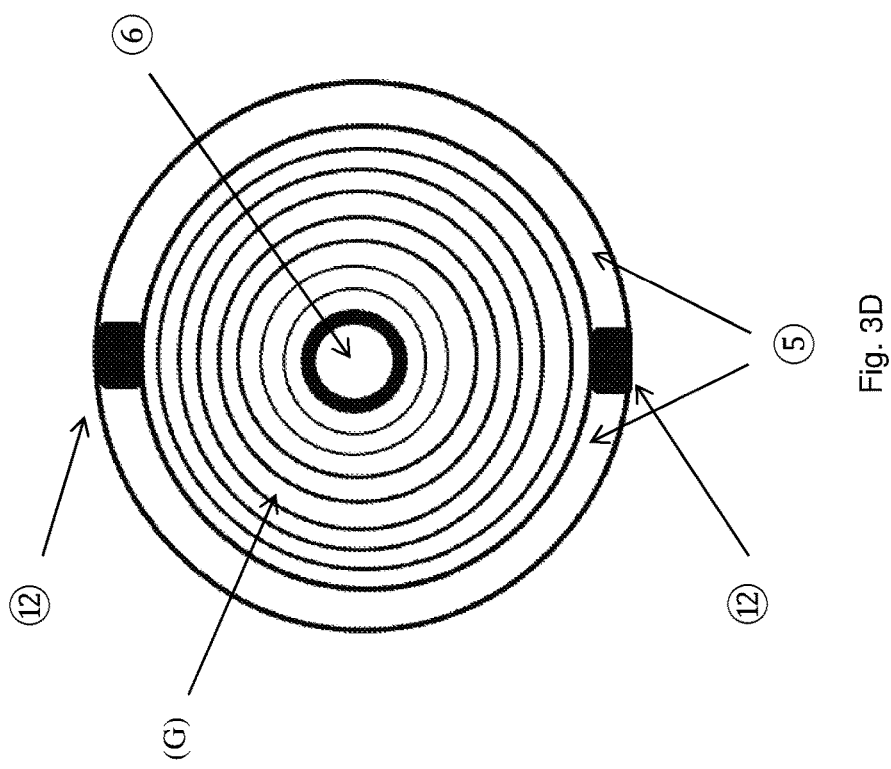
FIG. 3D provides a schematic of the base poles of the Receptacle and interior contactor zones.

FIG. 3-1 shows an example of the preferred embodiment of the Connector and the Receptacle Unit. FIG. 3A presents the conical configuration of the Connector with potential/alternative contactors (F), such pogo pin or slot protruding electronic contactors utilized for connections with the CHAdeMO control lines ①②④⑦ and ⑩ and potentially ③ for camera transmissions, and CAN BUS connections ⑧ and ⑨ (as depicted at FIG. 15), but may be further configured (by means of switch gear and a microprocessor) to accommodate sequence circuit variants such as IEC 62196-2 Type 2. In the preferred embodiment, specified pogo pins (for example, numbers ⑧ and ⑨ of FIG. 3A) will occupy specific and constant positions on all Connectors, so as to provide consistency in communications schemas upon independent interactions with any single Receptacle from a bevy of receptacles. As depicted in FIG. 3A, only the spring loaded portion of the contactor, or the exposed portion in the case of the slot protruding contactor, is to be revealed outside of the Connector body. The electronic contactors that protrude from the exterior of the Connector body are arranged in a spiral configuration so that no two contactors share the same plane that is horizontal to the base of the Connector. FIG. 3A further discloses the extended poles identified by the encircled numbers ⑤ and ⑥ as described at FIG. 15). The poles ⑤ may be isolated as separate charging phases in the case of a 3-phase charging schema, as presented at FIG. 3D. The Receptacle of FIG. 3B, congruent in receiving area dimensions to the exterior portion of Connector (FIG. 3A), depicts contact zones with associated wiring (G), said contact zones to be a circular band on the surface of the receiving area of the Receptacle and each such band to occupy an insulated plane, such that no contactor that protrudes from the Connector body will connect with more than one receptacle contact zone when the unit is fully seated and operational. The wiring (G) extending from the contact zones is utilized for connections with the CHAdeMO control lines ①②④⑦ and ⑩ and potentially ③ if not for camera transmissions, and CAN BUS connections ⑧ and ⑨ (as described at FIG. 15). FIG. 3B further identifies the respective poles ⑤ and ⑥ wherein the base pole ⑤ may be partitioned and isolated as separate charging phases in the case of a 3-phase charging schema. The base pole ⑤ provides a beveled Receptacle base that guides the chamfered. connector bar/pole and pressure that is exerted from the interaction of the extension of the chamfered Connector poles with the beveled Receptacle base forces a seating of the respective contact points. It may be that the pole at the apex of the Connector ⑥ in FIG. 3A is fixed, so that no protrusion is possible; however, it is expected that a spring or other form of forced separation is desirable to facilitate the removal of the Connector from the Receptacle when a charging or discharging session is concluded. The Receptacle of FIG. 3B may include a disconnect switch, if not present within the electric vehicle's safety system, which is considered necessary to prevent potential shorts or arcing when the charging Connector is not engaged or in the case of damage caused by a collision. FIG. 3A further indicates the location of the guide stop (11) on the bottom of the connector apex pole.

Figure 3C:
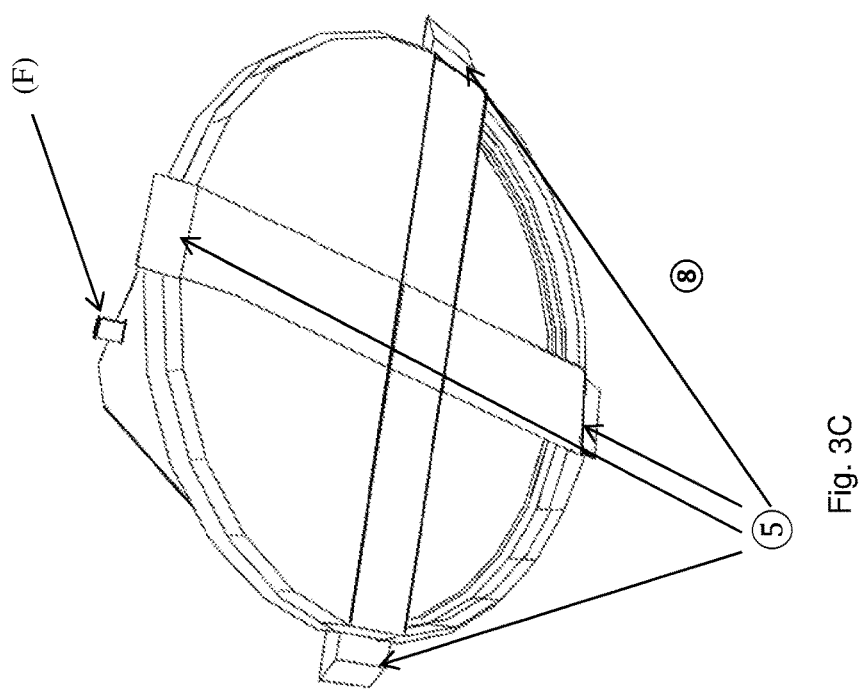
FIG. 3C provides a schematic of the base poles of the Connector and a contactor.

FIG. 3-II presents a view of the Connector and the Receptacle configured for Level 1, 2 or 3 charging. FIG. 3C identifies the multiple base poles ⑤ which will be isolated into different regions by the insulating materials (12) shown on FIG. 3D. The Connector of FIG. 3C shows one of the contactors (F) on the exterior portion of the body. The Receptacle of FIG. 3D, congruent in receiving area dimensions to the exterior portion of Connector, depicts contact zones (G) within the receiving area, said contact zones to be a circular band and each such band to occupy an insulated plane, such that no contactor that protrudes from the Connector body will connect with more than one receptacle contact zone when the unit is fully seated and operational. The insulating material between such contact bands may be luminescent so as to provide an optical guide for further ease of alignment. FIG. 3D further identifies the Receptacle base poles ⑤ occupying partitioned regions. The insulating material serving as the partitioning material (12) will have a width that is greater than the width of the Connector base pole tabs shown in FIG. 3C to ensure that a single Connector tab will not come into contact with both of the partitioned base poles of the Receptacle. FIG. 3D also identifies the Apex pole ⑥ if the Receptacle.

FIG. 3-III presents the Connector with extended apex and base poles, with spirally positioned contactors on its surface, and with cameras (13), said cameras to be utilized to assist the alignment of the Connector with the Receptacle by making reference to the concentric contact bands or the luminescent insulating bands within the receiving area of the Receptacle for applications that include automated positioning equipment.

FIG. 4 shows a slight side-view of the Connector (FIG. 4A) with spiral configuration (H) of contactors and wiring harness (I) for leads to pogo pin contactors, positive and negative poles, and pole controlling motor. FIG. 4A provides a view of the Connector with retracted base pole(s) and telescoping apex pole (which, in the preferred embodiment, would be energized as a positive charge if the energy transference were to be direct current in nature). A further interior view of Connector (FIG. 4B) reveals a motor (FIG. 4B(i)) whether a step motor, motor with limit switch or servo motor) which may be utilized for controlling the "telescoping" of the apex pole (positive in the case of DC charging), if not spring loaded; but, in particular, for the extrusion of the Connector base poles, which act as positioning/alignment AND alternating current or direct current (negative in the preferred embodiment) pole(s). The Connector base poles are to be engaged once the Connector contactors are depressed, at which sequence the controller provides guidance. A hand-held device specially built for a newly dedicated charging platform (i.e., not a retro-fit) may include a manual engagement process, wherein the base poles may be extended or may be engaged by a (reversible) trigger on the handle the charger. Also shown on FIG. 4B is a microprocessor/microcontroller (FIG. 4B(ii)) which assesses (a) pogo pin status (engaged or not engaged) (b) alignment of Connector pins with Receptacle control line contacts (or CAN BUS contacts as the case may be) (c) expected direction of energy transference (d) the grounding of the load and (e) timing of energizing the individual poles; and controls (aa) pin-to-contact switching, (bb) status lights on display panel of the Connector's end cap (cc) audio alarms (dd) extension and/or retraction of the poles and (ee) energizing of the poles. FIG. 4B also depicts a terminal bus with embedded relay (FIG. 4B(iii)) which, in one embodiment may act in the capacity as switchgear to enable configurations of standards other than CHAdeMO. FIG. 4B reveals the respective pole housings (J). In this view, the Connector base pole(s) are protruding from the housing(s).

FIG. 5 presents a view of the end-cap (FIG. 5A) to the Connector. The end-cap features a multi-colored lighted display (K) which indicates that the charger is either (i) engaged (ii) in the process of changing states or (iii) not engaged. FIG. 5A also identifies an inlet with a standard pin configuration (L) (in this case showing ten pins to correspond with the CHAdeMO Sequence Circuit), an optional USB Port (M) for engaging with the programmable logic control and the functionality of the microprocessor and/or microcontroller (firmware uploads, data downloads, et al) and for trouble shooting, and a retention latch inlet (N) for use in securing the Connector, as may be necessary, to the charging equipment either directly or via an adapter (as identified in FIG. 6). The side view of the FIG. 5A end cap (FIG. 5B) reveals the wiring that will interface with the terminal bus within the body of the Connector. FIG. 5C provides a view of the Connector featuring a tapered body with base poles retracted and the apex pole extended (depicting a state whereby the charging connector is disengaging from the energy storage device Receptacle at the conclusion of a charging or discharging process). Not shown in FIG. 5 is an audio alarm, consisting of a compact speaker controlled by the microprocessor, which would serve to alert users of a matter requiring attention, such speaker to be present in the preferred embodiment.

FIG. 6 depicts the Connector adapter (FIG. 6A) with custom pin configuration (FIG. 6B) which may be designed to interface with any of the commercially available charging station connectors (e.g., from manufacturers including Yazaki, Fujikura, Sumitomo Electric Industries, DYDEN, Furukawa Electric, the SAE J1772 standard, the IEC 62196-2 Types 1, 2, 3 and the Hybrid standards, the Japan Aviation Electronics Industry standard, etc., a representative listing of the aforementioned as is reflected in Table 1 to the Specification). The Connector adapter will enable interfacing with a congruent charging unit connector on one side and a standard pin configuration (FIG. 6C) on the opposite side of the adapter. One of the pins of the standard configuration set will include an alignment key (O), and a complementary pin inlet on the end-cap (P), so that the adapter may only be inserted in the allowable position into the end cap. In addition, the retaining latch (Q) and corresponding retaining latch inlet (R) on the end-cap (FIG. 6D) further promote proper alignment of the pins to the pin inlets. This embodiment, which includes a form of "latching" device to ensure that the integrity of the connection remains, allows the user to swap adapters should the need arise. While not depicted in FIG. 6D. the multi-colored status display and the USB port (described in FIG. 5) would also be present in the preferred embodiment.

FIG. 7 shows an alternative geometric shape (in this case, a triangular pyramid) utilized for the Connector (FIG. 7A), and a congruent shape for the energy storage device Receptacle (FIG. 7C). In the form presented, the contactors are displayed in a pattern other than a spiral. Proper alignment is accomplished in this scenario by establishing an anchor point from which the other contactors may be referenced. FIG. 7B presents a top down view of FIG. 7A. The anchor point contactors on each of FIG. 7A and 7B are represented by the pair of adjacent contactors (S). Other configurations are possible, but an anchor point contactor (or contactors) and reference contactors will be required in any alternate contactor configuration or pattern. As indicated in FIG. 3A, contactors other than pogo pins (e.g., slot protruding contactor strips) may be utilized. Contactor zones (T) within the Receptacle of FIG. 7C are identified, along with terminal points and wiring (U) on the surface of the Receptacle. The lead to the pole contact (V) is also presented. A disconnect switch may be included at a point between the pole (V) and the energy storage device or load, in one embodiment, if not present within the energy storage device or load's safety system, This is considered necessary to prevent potential shorts or arcing, including time periods when the Connector is not engaged with the Receptacle.

FIG. 8 shows another angle of view of the triangular pyramid configuration of the Connector (FIG. 8A) identifying base poles (W) and the apex pole (X) and Receptacle (FIG. 8B) with base pole(s) (Y) and Receptacle apex pole (Z). FIG. 8A clearly shows the Connector contactors ((AA) which, again, may include slot protruding contactors or other equally serviceable contactors) whereas FIG. 8B identifies the Receptacle contactor zones (AC). In addition, a slight inward view of end-cap at FIG. 8A reveals the interior pin inlet housing with wiring at the pin inlet terminal locations. The larger wires depict the poles, while thinner wires indicate control lines or CAN BUS lines (AB).

FIG. 9 depicts the Connector adapter (FIG. 9A) with custom pin configuration (FIG. 9B) which may be designed to interface with any of the commercially available charging station connectors (e.g., from manufacturers including Yazaki, Fujikura, Sumitomo Electric Industries, DYDEN, Furukawa Electric, the SAE J1772 standard, the IEC 62196-2 Types 1, 2, 3 the Hybrid standards, the Japan Aviation Electronics Industry standard, etc., a representative listing of the aforementioned as is reflected in Table 1 to the Specification). The Connector adapter will enable interfacing with a congruent charging unit connector on one side and a standard pin configuration (FIG. 9C) on the opposite side of the adapter. One of the pins of the standard configuration set will include an alignment key (AD), and a complementary pin inlet on the end-cap (AE), so that the adapter may only be inserted in the allowable position into the end cap. In addition, the retaining latch (AF) and corresponding retaining latch inlet (AG) on the end-cap (FIG. 9D) further promote proper alignment of the pins to the pin inlets. This embodiment, which includes a form of "latching" device to ensure that the integrity of the connection remains, allows the user to swap adapters should the need arise. FIG. 9D also depicts a USB port (AH) and a multi-colored status display (AI). Not shown on FIG. 9D, but present in the preferred embodiment, would be an audio alarm.

FIG. 10 indicates an alternate configuration of the charging Unit as a geometric hexagonal pyramid configuration, wherein the Receptacle (FIG. 10A.) indicates a specified pattern of contact zones and, likewise, the Connector (FIG. 10B) holds a pattern of contactors that will need to properly align the control lines and CAN BUS utilizing a contact anchor (or anchors) with associated reference contactors. The poles of the Connector are shown as extended in FIG. 10B. The end-cap (FIG. 10C) provides a view of the interior portion, indicating the standard configuration of pin inlets (with alignment key), the retaining latch structure, the USP Port terminal and the Lighted Display cover.

Figure 11:
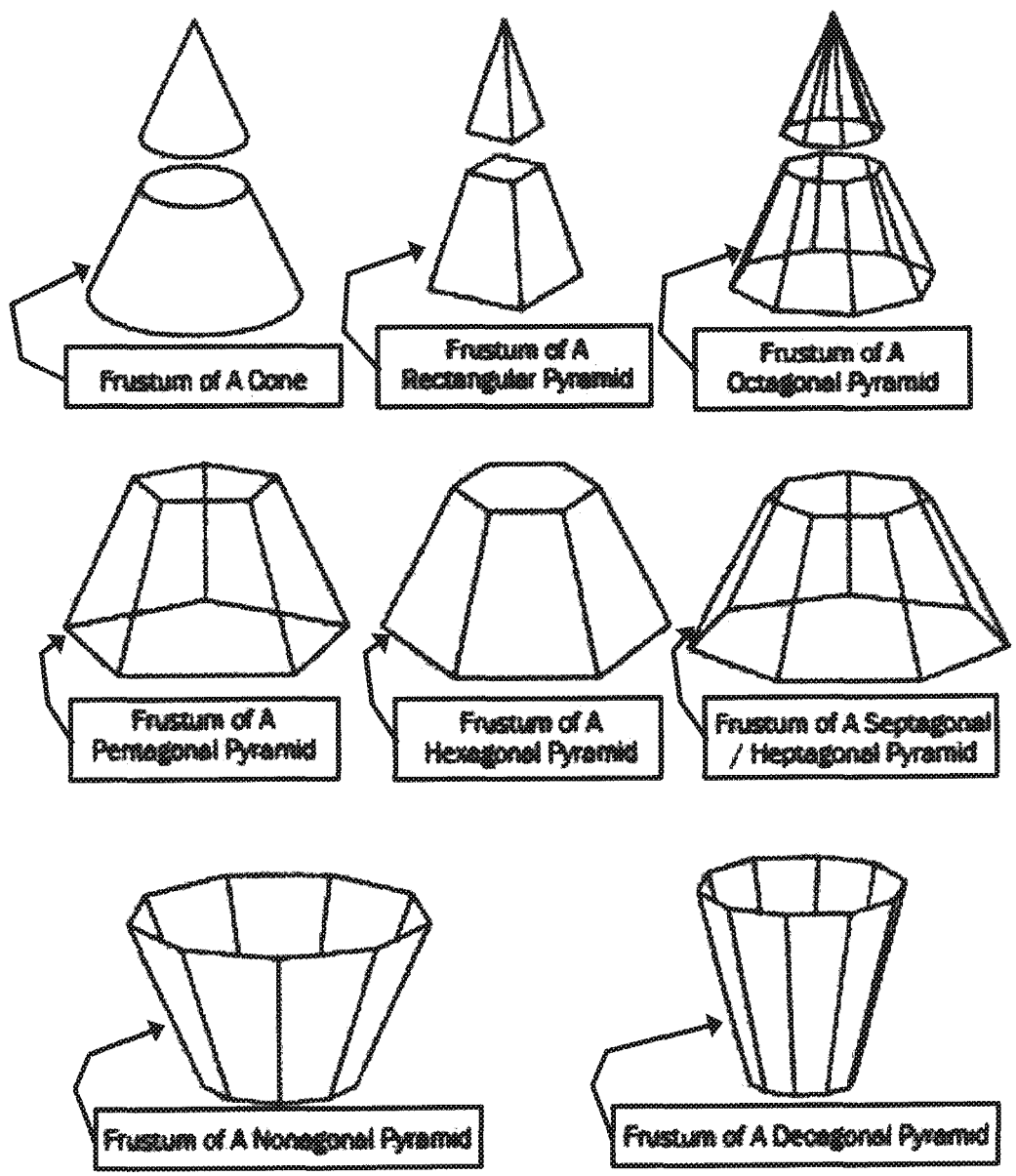
FIG. 11 presents a wide variety of frustum with exterior shape of a solid geometric form that may be utilized to accomplish the self-aligning objectives for either the Connector or the Receptacle of the subject charging Unit.

FIG. 11 provides a variety of frustum of geometrical shapes that may be suitable as self-aligning instruments for effecting the "force and dexterity reduced" coupling as compared to conventional charging units. The expectation is that the Connector will be constructed as a frustum, as can be the Receptacle; however, there is greater flexibility with respect to the exterior design of the Receptacle, as the apex of the Receptacle will hold a fixed pole contactor. As indicated in the description of the preferred embodiment, a conical or cone shaped instrument is theoretically ideal. There is a continuing debate as to whether a cone has a single side or, rather, an extensive number of planes or lines that would be indicative of more than a single side. For purposes of this patent application the author will subscribe to the argument that a cone has a singular outer side. Therefore, the intent of the utilization of geometrical shapes in this patent application is limited to shapes containing greater than or less than two sides, but excluding shapes with only two sides.

Figure 12:
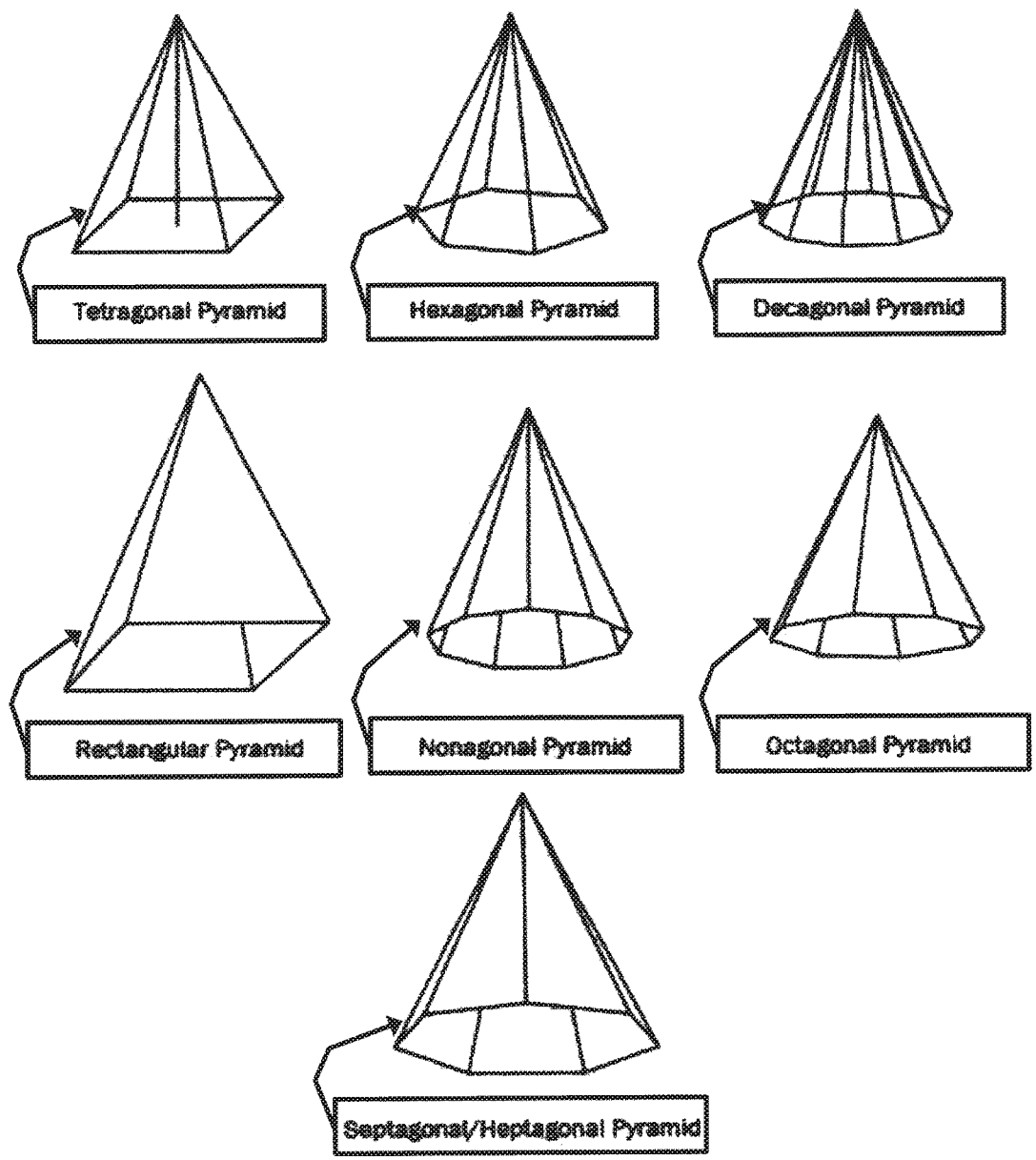
FIG. 12 present non-frustum devices with exterior shape of a solid geometric form that may be utilized to accomplish the self-aligning objectives of the subject charging Unit.

FIG. 12 presents possible geometric shapes that may be utilized for the Receptacle (indicating that a frustum is not essential to the outer dimensions of the Receptacle).

Figure 13:
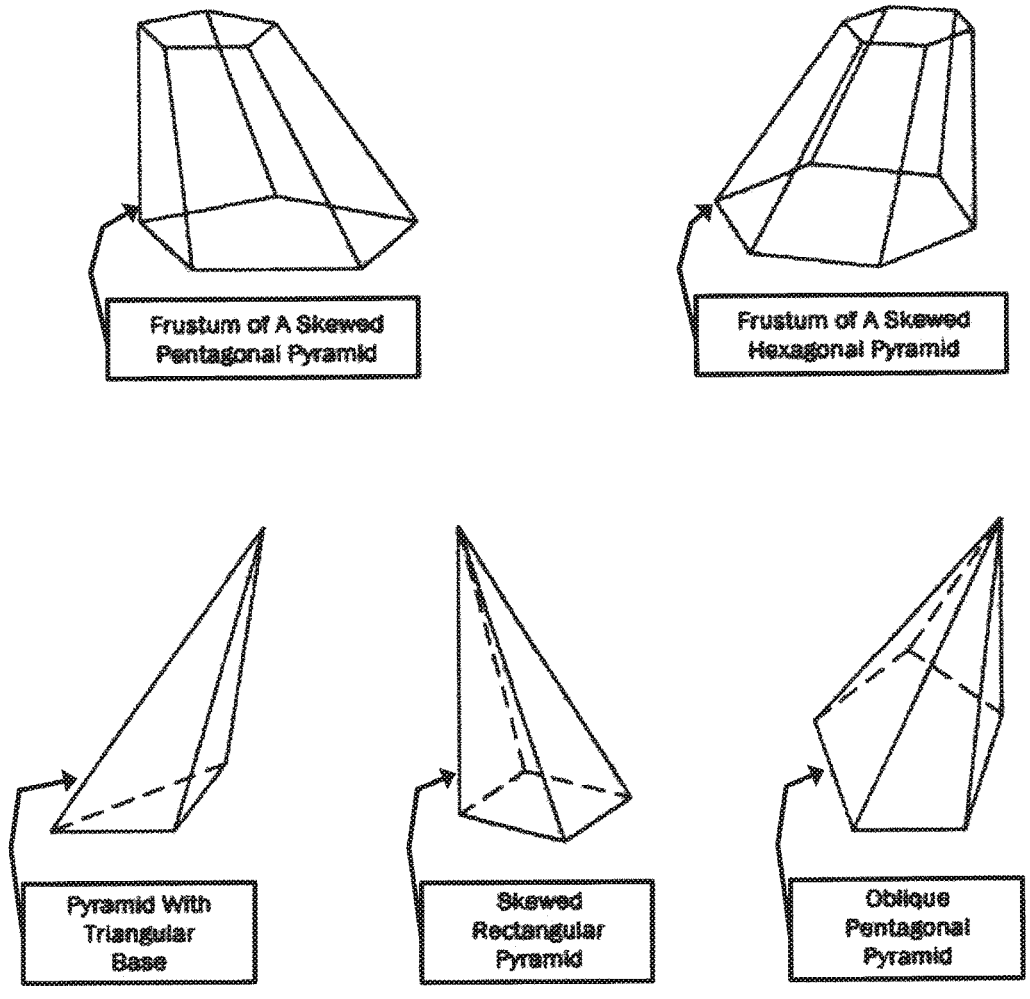
FIG. 13 present skewed and oblique configurations with exterior shape of a solid geometric form that support self-alignment of the charging Unit.

FIG. 13 identifies addition geometric shapes that may be utilized in achieving self-alignment and, therefore, the force and dexterity reduced goals of a charging Unit pursuant to this invention. FIG. 13 clarifies that skewed or oblique shapes are to be considered as viable alternatives to be explored. With respect to the preferred embodiment, the base of the Connector (including any angle created by the addition of an end-cap) does not need to be parallel to the opening at the apex of the frustum of the cone or pyramidal shape in order to obtain the desired self-alignment goal of the invention.

Figure 14:
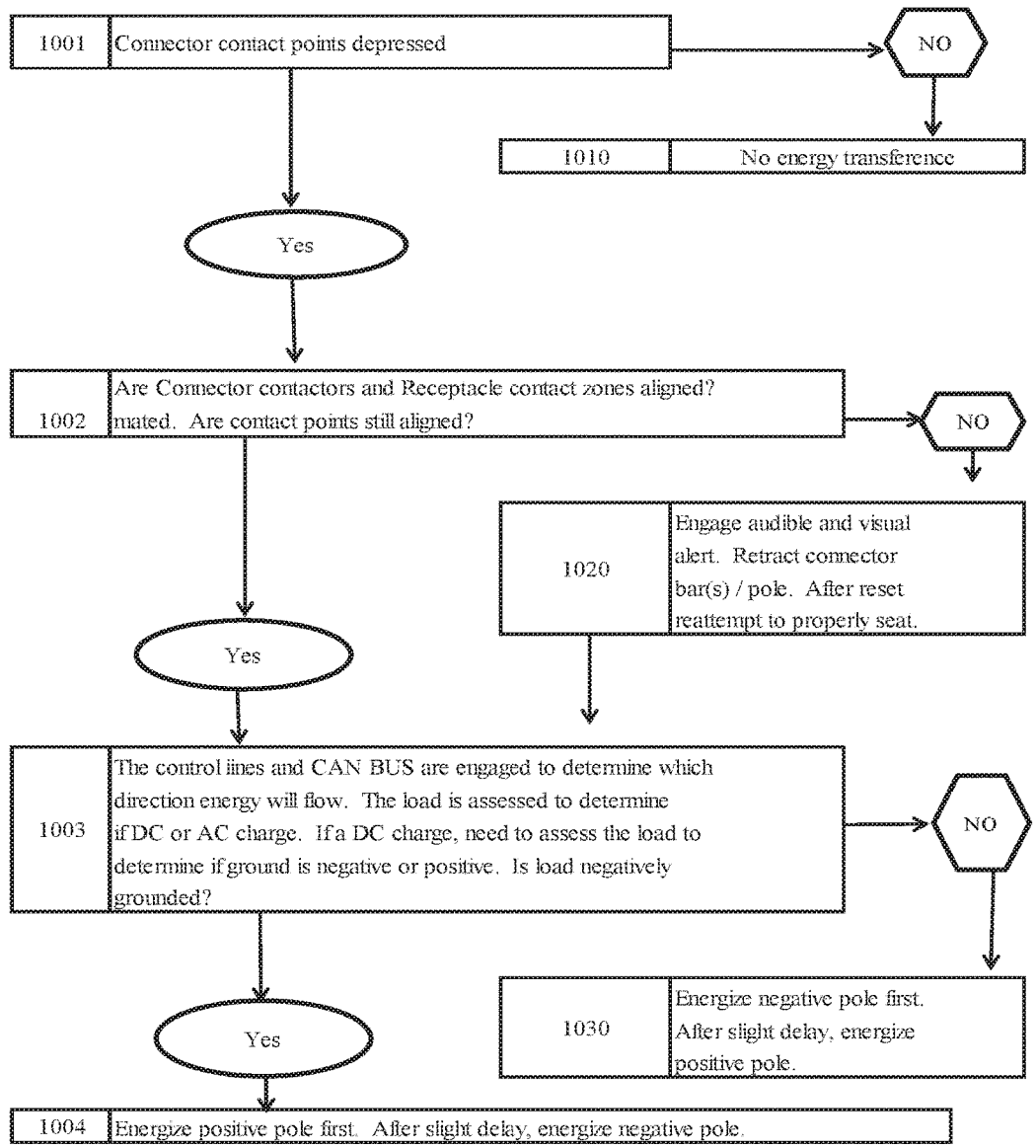
FIG. 14A continued to FIG. 14B depicts an algorithm for engaging and activation the transference of energy by means of the charging Connector and Receptacle Unit; and, FIG. 15 presents the CHAdeMO Sequence Circuit as a guide or reference.
Figure 14B:
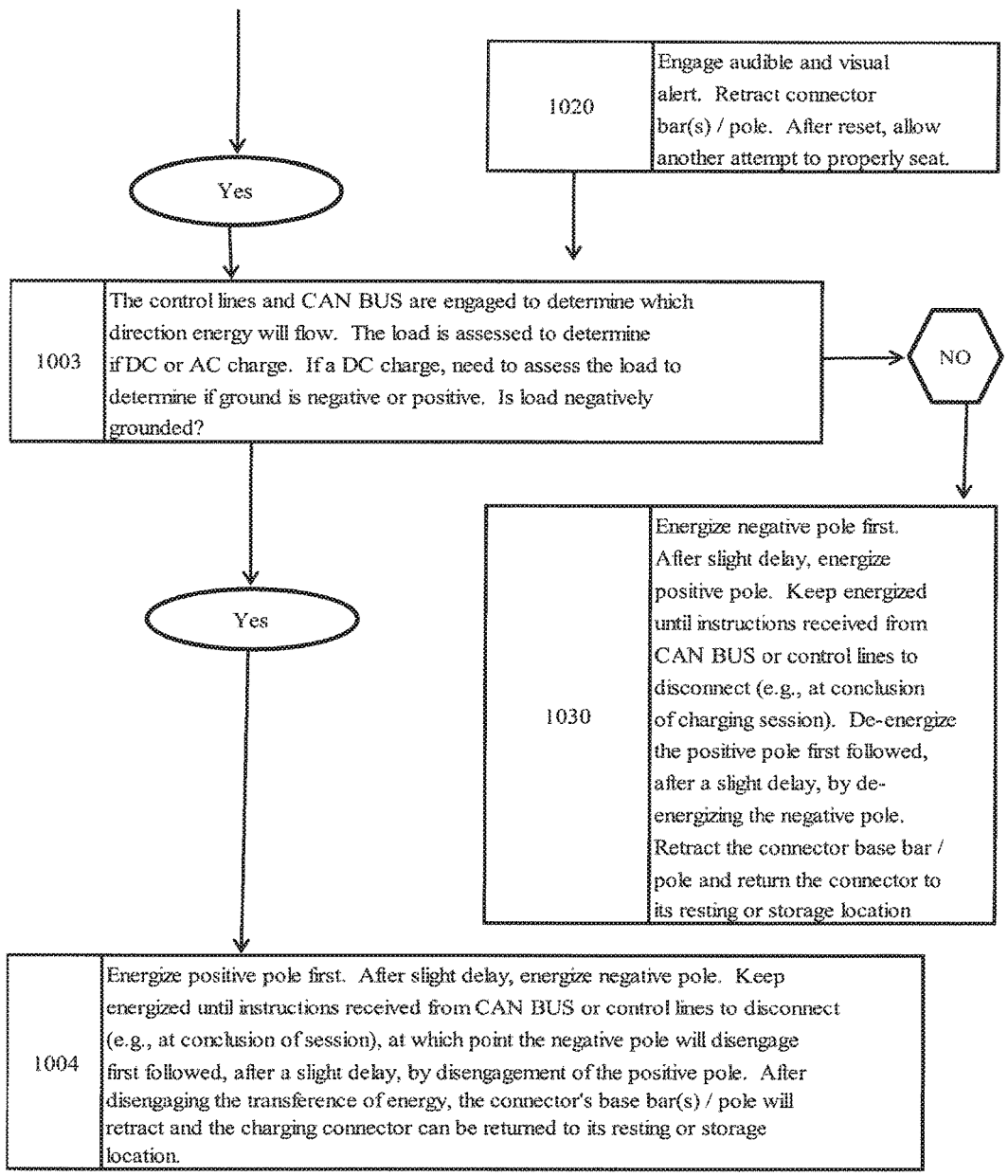

FIG. 14A describes the algorithm of the software or firmware that controls the utility of the invention. The Connector is to be inserted into the Receptacle, be it by manual insertion or via an automated process. For clarity, if by automation (e.g., robotic arm), the act of locating the proximity of the vehicle Receptacle to the robotic arm end effector (Connector) may be facilitated by incorporating LED lights or other beacons into the Receptacle; for example, the insulating barriers between the Receptacle contact rings, in the preferred embodiment, may contain such reference attributes. Once the Connector has been inserted into the Receptacle, the Connector ascertains if the Connector contact points are depressed (1001). If not, no energy transference will commence (1010). If the contact points are depressed then (1002) the base DC pole/tabs or AC leads (as the case may be), with chamfered end point(s), will be extended towards the base of the Receptacle which features a beveled ring (in the case of a cone) or bracket that serves as a Receptacle pole. As the Connector pole extends through engagement of the motor, the chamfered edge catches the edge of the base of the Receptacle and the result is that the Connector is forced to seat properly with the Receptacle. The algorithm assesses the position of the contactors to verify that proper mating of the Connector contactors with the Receptacle contact zones has occurred. If proper mating has not occurred, (1020) an alert (visual and potentially audible) will prompt the user that a malfunction has occurred, at which point the base pole will retract to allow the user to reseat the Connector. If proper mating has occurred, the Connector will perform further diagnostics on the load to determine if an AC or a DC charging session is appropriate and if it is a DC session the load will be assessed to determine if it is or, alternatively if it is not, negatively grounded and the charging Unit and will then engage the transference of energy, as directed by the vehicle or energy storage device control system (first) or the charging equipment (second). Based upon the results of the diagnostics, the Connector will engage energy to the negative pole first if the load is positively grounded (1030) or the positive pole first if the load is negatively grounded (1004) in an effort to prevent harm to both individuals and to the vehicle/energy storage device and to the charging equipment. In sessions where the negative pole is first energized (1030), the positive pole will be energized after a slight delay. Energy will continue to flow to the load until instructions are received from any of the vehicle, the energy storage device control system or the charging equipment to discontinue the charging session at which time the positive pole will be de-energized first and, after a slight delay, the negative pole will be de-energized. Once all poles have been de-energized, the Connector base poles will be retracted and the Connector will return to its resting or storage location. In sessions where the positive pole is first energized (1004), the negative pole will be energized after a slight delay. Energy will continue to flow to the load until instructions are received from any of the vehicle, the energy storage device control system or the charging equipment to discontinue the charging session at which time the negative pole will be de-energized first and, after a slight delay, the positive pole will be de-energized. Once all poles have been de-energized, the Connector base poles will be retracted and the Connector will return to its resting or storage location.

FIG. 15 simply replicates the CHAdeMO sequence circuit, which is one of the standard vehicle charging configurations currently utilized by selected electric vehicle manufacturers and respective charging station manufacturers.

In the context of this application, the use of the term vehicle also applies to energy storage devices, such as battery banks.

The configuration of the Receptacle is intended to allow for easy cleaning and reduced maintenance, as there are fewer (if any) moving parts to concern the vehicle owner. Most of the required maintenance, based upon the preferred embodiment, will take place with the Connector. In addition, it is the preferred embodiment that the primary components that introduce weight into Unit are located within the Connector, so as to minimize the weight of the receptacle. This would he especially important in the context of a vehicle, where the weight of a vehicle in total has a bearing on its equivalent mileage per energy unit consumed. However, an allocation of weight to the components may be necessary if the weight of the Connector becomes too overwhelming for either the individual or the automated charging system as a whole.

What is claimed:

1. A coupling assembly for transferring electric energy to or from an energy storage device or to a load, comprising:
   a. a connector having an interior and exterior connector portion with the exterior connector portion having a solid geometric form consisting of at least one side and having a surface slope from a perimeter of a base to an apex of less than 90 degrees with at least two electrically conductive communicating contacts positioned on said exterior connector portion, each such electrically conductive communicating contact positioned on a plane independent of each other electrically conductive communicating contact, said connector having a connector apex pole at said apex and a base pole at said base, said connector interior portion being hollow and and said connector possessing freedom of movement prior to coupling, and
   b. a receptacle having an inner surface forming a receiving surface to receive said connector, said receiving surface being complementary and congruent in dimensions to the connector exterior portion, said receptacle with at least two spaced apart continuous electrically conductive bands positioned on said inner surface, said conductive bands located on planes causing direct interaction with a single one of the electrically conductive communicating contacts upon seating of the connector in the receptacle, each said electrically conductive communicating contact forcibly repelling said connector exterior portion from the receptacle inner surface preventing a seal, said apex pole directly contacting said receptacle inner surface, said connector pole forcibly repelling said connector exterior portion from the receptacle inner surface, said base pole forcibly compresses said electrically conductive communicating contacts and said apex pole to a seated portion on the receptacle inner suface during a charging session upon application of a mechanical force, said connector base pole disengaging the connector apex pole from the receptacle inner surface at a termination of a charging session, and c. at least one microprocessor in the hollow connector interior portion.

2. The coupling assembly of claim 1 wherein said connector base pole is energized as a phase discrete from a phase that said connector apex pole is energized when energized by an alternating current power distribution system.

3. The coupling assembly of claim 1 wherein said connector base pole is energized as a discrete negative or a discrete positive conductor and wherein said connector apex pole is energized as a charge opposite that of said connector base pole when energized by a direct current power distribution system.

4. The coupling assembly of 1 wherein the connector base pole reversibly extends beyond the perimeter of the connector body upon application of a mechanical force.

5. The coupling assembly of claim 1 wherein each said connector base pole reversibly extends beyond a perimeter of a connector base circumference upon application of a mechanical force causing direct contact between said connector base pole and said receptacle.

6. The coupling assembly of claim 3 wherein said connector base pole extends by application of a mechanical force causing said connector exterior portion and said inner surface of said receptacle to become closer in proximity, said connector exterior portion and said receptacle inner surface maintaining an air gap.

7. The coupling assembly of claim 1 wherein said connector apex pole separates from the connector upon application of a mechanical force, said connector apex pole remaining attached to the connector by means of a guide with fixed stops.

8. The coupling assembly of claim 1 wherein the electrically conductive communicating contacts serve as mediums for communications, control or information transfers.

9. The coupling assembly of claim 1 wherein each receptacle base pole and each receptacle apex pole is energized as a discrete single phase, split phase or separate phases in a three phase system when energized by an alternating current power distribution system consisting of one or more phases.

10. The coupling assembly of claim 1 wherein each receptacle base pole is energized as either a negative or a positive conductor and wherein each apex pole is energized as charge opposite that of each base pole, either positive or negative, when energized by a direct current power distribution system.

11. The coupling assembly of claim 1 wherein the receptacle conductive contact bands serve as mediums for communications, control or information transfers.

12. The coupling assembly of claim 2 wherein the energizing of each connector base pole and each connector apex pole as a positive or negative charge in a direct charge system is controlled by the microprocessor to be asynchronous between the connector base pole and the apex pole so that a correct polarity sequence occurs in the transference of energy.

13. The coupling assembly of claim 1 wherein each electrically insulative band located between each pair of said electrically conductive bands within said interior portion of said receptable body is formed of a luminescent or translucent material.

14. The coupling assembly of claim 13 wherein the electrically conductive bands within the interior portion of the receptacle body are formed of a non-luminescent or non-translucent material.

\* \* \* \* \*